US012574903B2

(12) United States Patent
Lim et al.

(10) Patent No.: US 12,574,903 B2
(45) Date of Patent: Mar. 10, 2026

(54) CONFIGURATION OF SUBCHANNEL IN WIRELESS LAN SYSTEM

(71) Applicant: LG ELECTRONICS INC., Seoul (KR)

(72) Inventors: Dongguk Lim, Seoul (KR); Jinyoung Chun, Seoul (KR); Jinsoo Choi, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 324 days.

(21) Appl. No.: 18/259,746

(22) PCT Filed: Dec. 20, 2021

(86) PCT No.: PCT/KR2021/019387
§ 371 (c)(1),
(2) Date: Jun. 28, 2023

(87) PCT Pub. No.: WO2022/145843
PCT Pub. Date: Jul. 7, 2022

(65) Prior Publication Data
US 2024/0080808 A1 Mar. 7, 2024

(30) Foreign Application Priority Data

| | | |
|---|---|---|
| Dec. 31, 2020 | (KR) | 10-2020-0189770 |
| Jan. 6, 2021 | (KR) | 10-2021-0001521 |
| Mar. 18, 2021 | (KR) | 10-2021-0035402 |

(51) Int. Cl.
*H04W 72/04* (2023.01)
*H04W 84/12* (2009.01)

(52) U.S. Cl.
CPC ............ *H04W 72/04* (2013.01); *H04W 84/12* (2013.01)

(58) Field of Classification Search
CPC . H04L 1/0008; H04L 5/0092; H04L 27/2603; H04W 84/12; H04W 72/0453; H04W 28/0278; H04W 72/232
See application file for complete search history.

(56) References Cited

U.S. PATENT DOCUMENTS

| | | | |
|---|---|---|---|
| 11,432,300 B2 * | 8/2022 | Wang | H04W 74/0816 |
| 2015/0117364 A1 * | 4/2015 | Asterjadhi | H04L 5/003 |
| | | | 370/329 |

(Continued)

FOREIGN PATENT DOCUMENTS

| | | |
|---|---|---|
| KR | 10-2018-0088470 | 8/2018 |
| KR | 10-2019-0107600 | 9/2019 |

OTHER PUBLICATIONS

PCT International Application No. PCT/KR2021/019387, International Search Report dated Mar. 21, 2022, 3 pages.

(Continued)

*Primary Examiner* — Iqbal Zaidi
(74) *Attorney, Agent, or Firm* — LEE, HONG, DEGERMAN, KANG & WAIMEY

(57) ABSTRACT

The present specification proposes a technique indicating a subchannel for a subchannel selective transmission (SST) operation of a wireless LAN system. For example, the present specification proposes an SST technique for supporting a maximum of 320 MHz band. The present specification proposes a technique for transmitting/receiving request information regarding a subchannel via a target wake time (TWT) request, and a technique for transmitting/receiving response information regarding a subchannel via a TWT response. The present specification proposes various techniques for displaying information regarding a TWT subchannel. The present specification proposes various techniques for constructing a bitmap for a TWT subchannel. A station (STA) of the present specification may perform an (Continued)

| Channel Indication (2 bits) | 80 MHz Channel Information (4 bits) |
|---|---|

| Channel Indication (1 bit) | 160 MHz channel information (8 bits) |
|---|---|

SST operation on the basis of a subchannel requested/responded according to various methods.

10 Claims, 19 Drawing Sheets

(56) References Cited

U.S. PATENT DOCUMENTS

| 2019/0174410 A1 | 6/2019 | Seok et al. |
| 2020/0015219 A1 | 1/2020 | Asterjadhi et al. |
| 2021/0360521 A1* | 11/2021 | Seok ................. H04W 52/0203 |

OTHER PUBLICATIONS

Intel et al., "Proposal for TWT Wide Range Parameters," IEEE 802.11-20/0913r5, Aug. 2020, 12 pages.

* cited by examiner (a)

Figure 3:
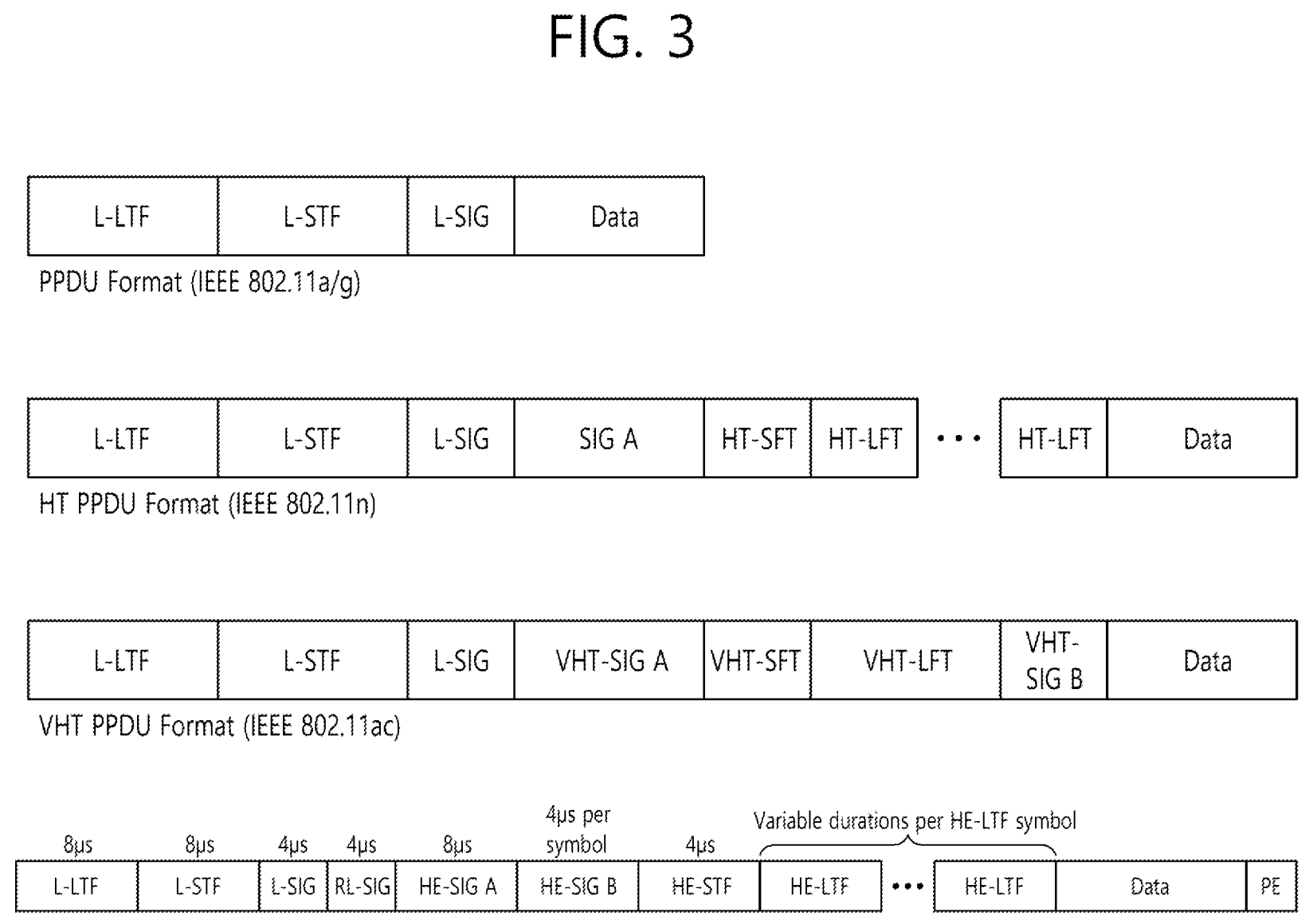

| L-LTF | L-STF | L-SIG | Data |
|---|---|---|---|

PPDU Format (IEEE 802.11a/g)

| L-LTF | L-STF | L-SIG | SIG A | HT-SFT | HT-LFT | ... | HT-LFT | Data |
|---|---|---|---|---|---|---|---|---|

HT PPDU Format (IEEE 802.11n)

| L-LTF | L-STF | L-SIG | VHT-SIG A | VHT-SFT | VHT-LFT | VHT-SIG B | Data |
|---|---|---|---|---|---|---|---|

VHT PPDU Format (IEEE 802.11ac)

| L-LTF | L-STF | L-SIG | RL-SIG | HE-SIG A | HE-SIG B | HE-STF | HE-LTF | ... | HE-LTF | Data | PE |
|---|---|---|---|---|---|---|---|---|---|---|---|

8μs    8μs    4μs    4μs    8μs    4μs per symbol    4μs    Variable durations per HE-LTF symbol

| Version independent field (1710) | Version dependent field (1720) |
|---|---|

| Channel Indication (2 bits) | 80 MHz Channel Information (4 bits) |
|---|---|

| Channel Indication (1 bit) | 160 MHz channel information (8 bits) |
|---|---|

| Element ID | Length | Control | TWT Parameter Information |
|---|---|---|---|
| Octets: 1 | 1 | 1 | variable |

CONFIGURATION OF SUBCHANNEL IN WIRELESS LAN SYSTEM

CROSS-REFERENCE TO RELATED APPLICATION(S)

This application is the National Stage filing under 35 U.S.C. 371 of International Application No. PCT/KR2021/019387, filed on Dec. 20, 2021, which claims the benefit of earlier filing date and right of priority to Korean Application Nos. 10-2020-0189770, filed on Dec. 31, 2020, 10-2021-0001521, filed on Jan. 6, 2021, and 10-2021-0035402, filed on Mar. 18, 2021, the contents of which are all incorporated by reference herein in their entirety.

TECHNICAL FIELD

The present disclosure relates to a wireless LAN system, and more particularly to a method for determining a sub-channel over which packets in a wireless LAN system are transmitted and received.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In order to support a high throughput and a high data rate, the EHT standard may use a wide bandwidth (e.g., 160/320 MHz), 16 streams, and/or a multi-link (or multi-band) operation or the like.

In the EHT standard, a wide bandwidth (e.g., 160/240/320 MHz) may be used for high throughput. Also, in order to efficiently use the bandwidth, preamble puncturing and multiple RU transmission may be used.

SUMMARY

The conventional subchannel selective transmission (SST) operation is not defined for the 320 MHz band. However, since the new wireless LAN standard, the EHT standard, supports the 320 MHz band, it is possible that the conventional SST operation will not work properly with the new EHT standard.

The technical features of the present disclosure relate to improvements to conventional SST operations. For example, this specification proposes technical features that efficiently perform SST operations in wideband. For example, the disclosure proposes efficient techniques for indicating subchannels for SST operations in wideband. For example, the specification proposes techniques in which information bits are used efficiently to indicate subchannels for SST operations in wideband.

This specification proposes various technical features. The various technical features may be applied to various types of devices and methods.

For example, a method based on the present disclosure may comprise, in a first STA (station), transmitting a target wake time (TWT) request field to a second STA. The TWT request field may include a TWT channel field for operation of the first STA. The TWT channel field may include a first sub-channel information field relating to at least one sub-channel on which the first STA may operate among a plurality of sub-channels, and a first sub-channel granularity field relating to a granularity of the first sub-channel information field, wherein the first sub-channel granularity field may have a length of one bit.

For example, a method based on the present disclosure may include the step of receiving, at the first STA, a TWT response field from the second STA in response to the TWT request field. The TWT response field may include a second subchannel information field related to at least one subchannel over which the second STA may operate, and a second subchannel granularity field related to a granularity of the second subchannel information field, wherein the second subchannel granularity field may have a length of one bit.

For example, a method based on the present disclosure may include, at the first STA, performing a subchannel selective transmission (SST) operation based on the TWT response field.

The technical features of the present disclosure may improve upon prior art SST operations. Specifically, according to the present disclosure, SST operations may be performed efficiently in wideband. For example, according to the present disclosure, subchannels for SST operations in wideband may be indicated efficiently. For example, according to the present disclosure, the overhead of information bits for indicating subchannels for wideband operation may be reduced.

BRIEF DESCRIPTION OF THE DRAWINGS

FIG. 3 illustrates an example of a PPDU used in an IEEE standard.

FIG. 13 illustrates an example of a PPDU used in the present specification.

DETAILED DESCRIPTION

Figure 1:
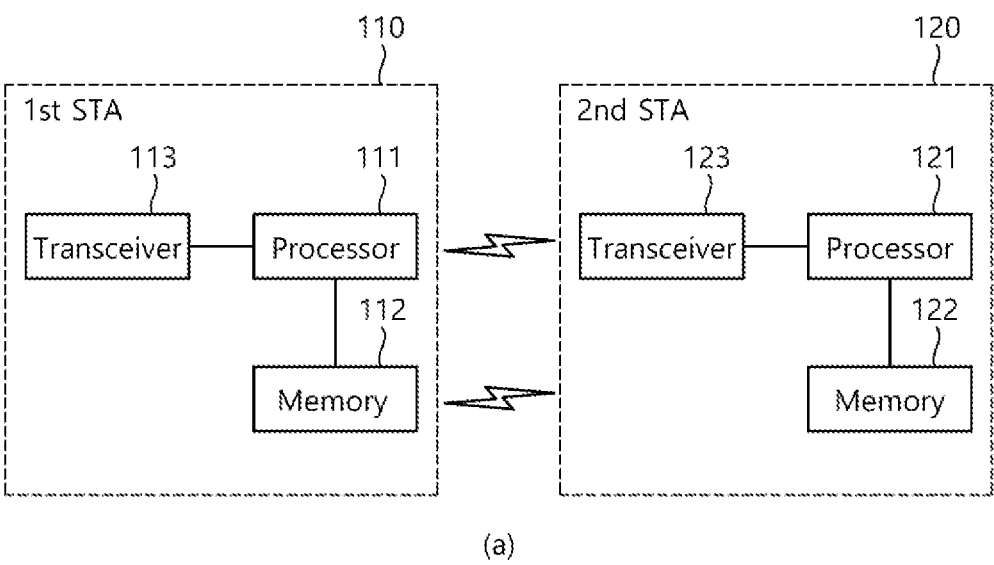
FIG. 1 shows an example of a transmitting apparatus and/or receiving apparatus of the present specification.
Figure 1:
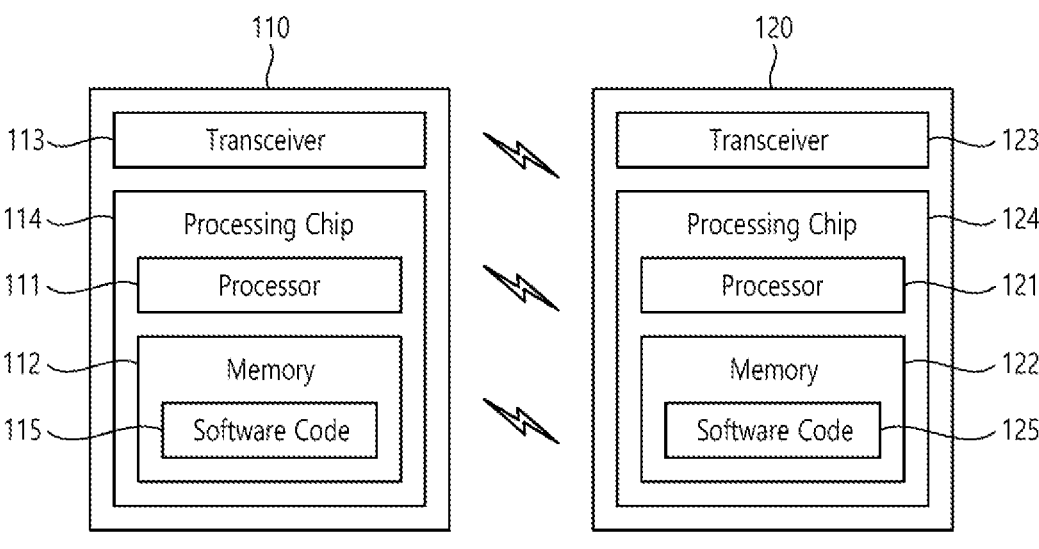

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP', the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an AP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
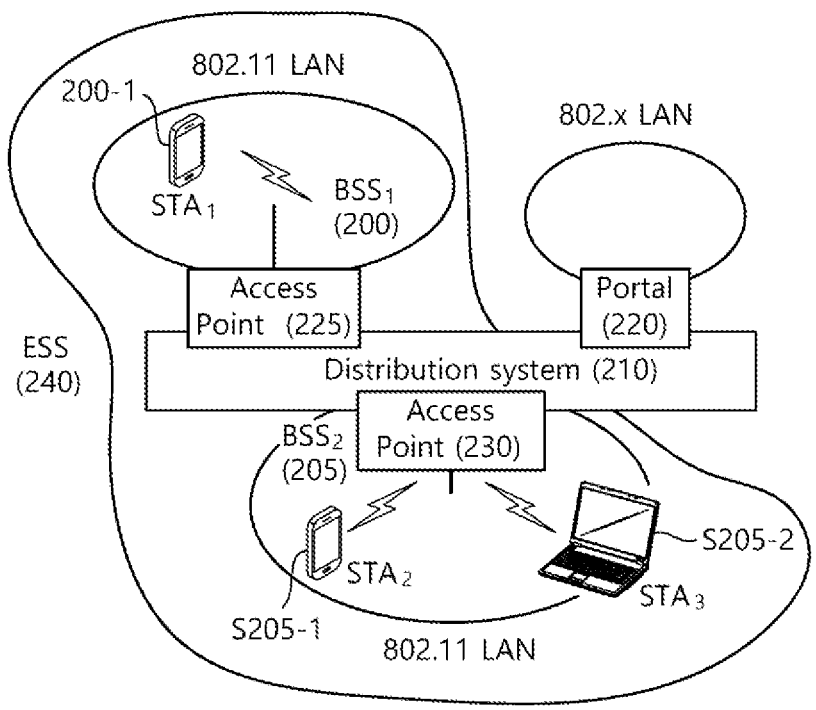
FIG. 2 is a conceptual view illustrating the structure of a wireless local area network (WLAN).
Figure 2:
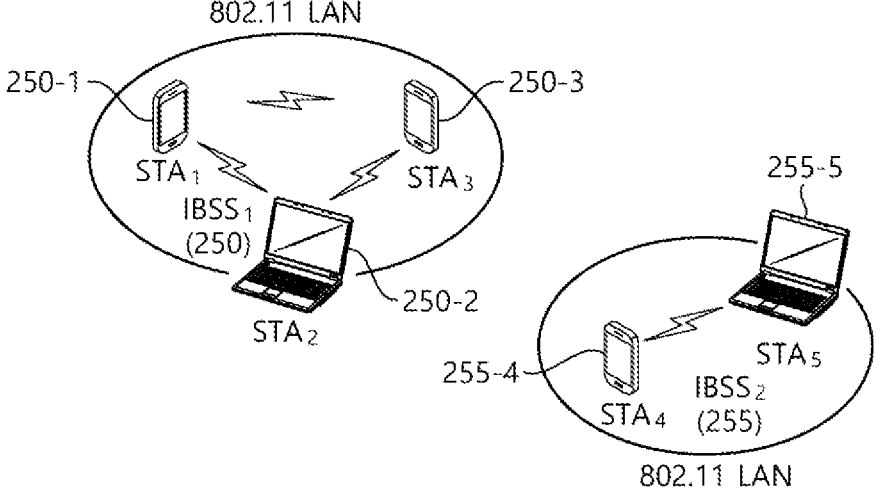

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates an example of a PPDU used in an IEEE standard.

As illustrated in FIG. 3, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 3 also includes an example of an HE PPDU according to IEEE 802.11ax. The HE PPDU according to FIG. 3 is an illustrative PPDU for multiple users. An HE-SIG-B may be included only in a PPDU for multiple users, and an HE-SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, a MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 4:
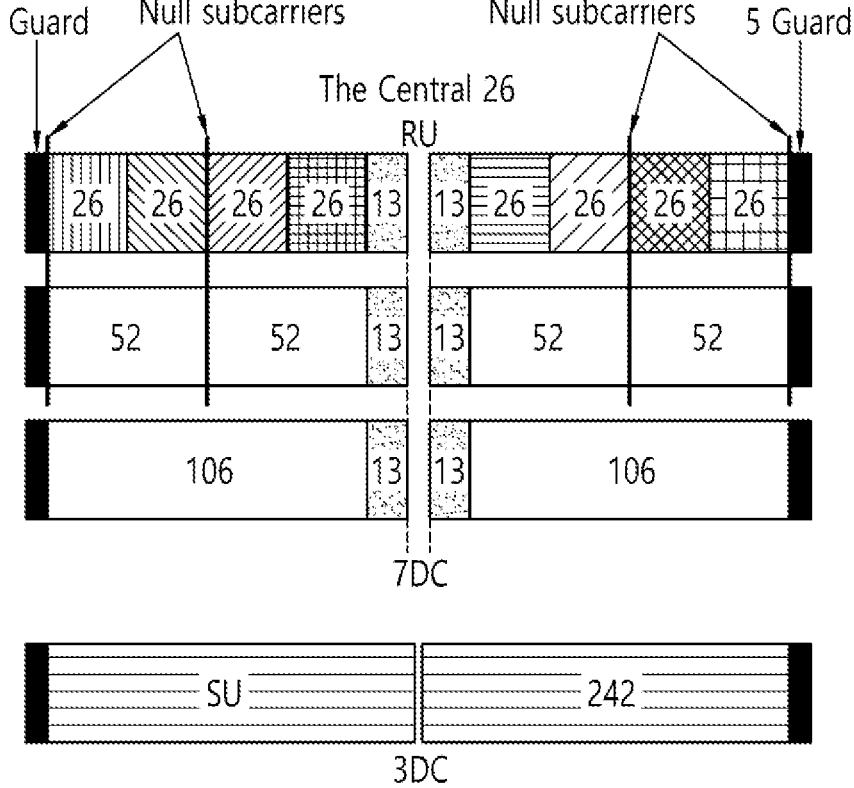
FIG. 4 illustrates a layout of resource units (RUs) used in a band of 20 MHz.

FIG. 4 illustrates a layout of resource units (RUs) used in a band of 20 MHz.

As illustrated in FIG. 4, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 4, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 4 may be used not only for a multiple users (MUs) but also for a single user (SU), in which case one 242-unit may be used and three DC tones may be inserted as illustrated in the lowermost part of FIG. 4.

Although FIG. 4 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 5:
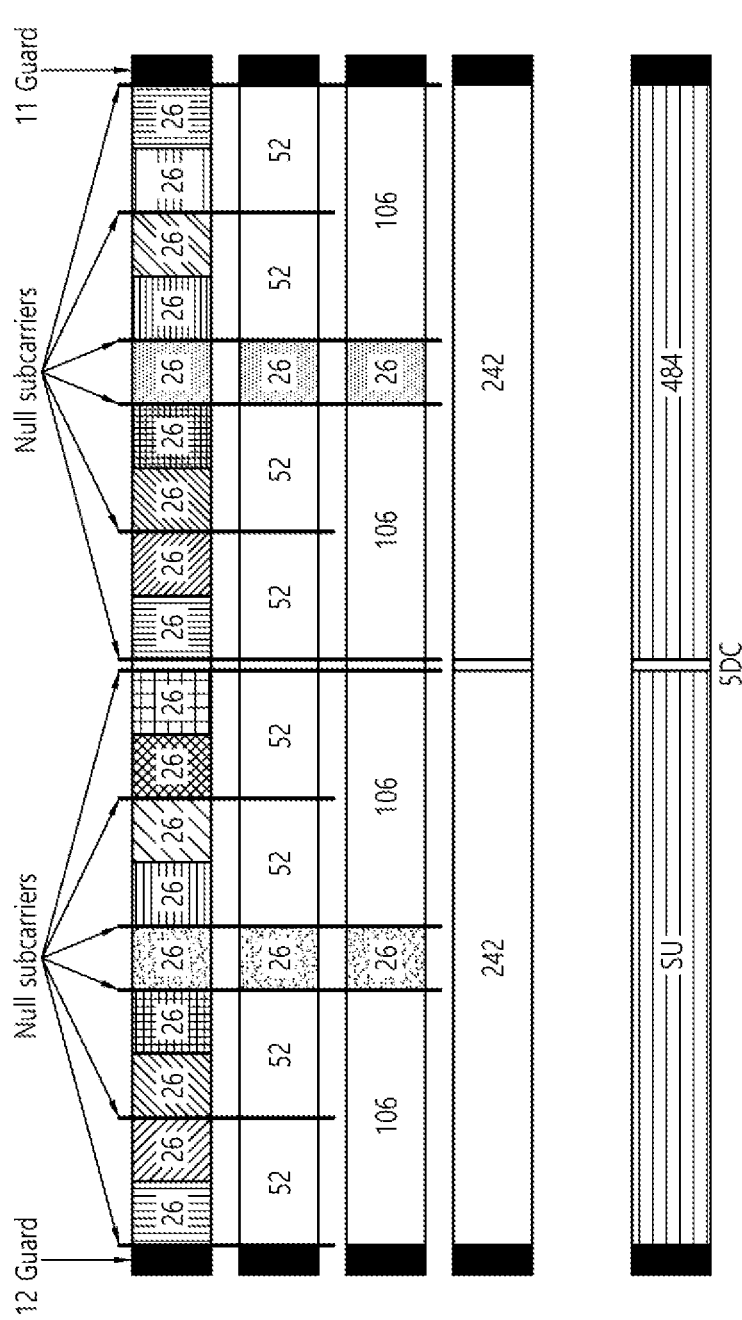
FIG. 5 illustrates a layout of RUs used in a band of 40 MHz.

FIG. 5 illustrates a layout of RUs used in a band of 40 MHz.

Similar to FIG. 4 in which RUs having various sizes are used, a 26-RU, a 52-RU, a 106-RU, a 242-RU, a 484-RU, and the like may be used in an example of FIG. 5. Further, five DC tones may be inserted in a center frequency, 12 tones may be used for a guard band in the leftmost band of the 40 MHz band, and 11 tones may be used for a guard band in the rightmost band of the 40 MHz band.

As illustrated, when the layout of the RUs is used for a single user, a 484-RU may be used. The specific number of RUs may be changed similar to FIG. 5.

Figure 6:
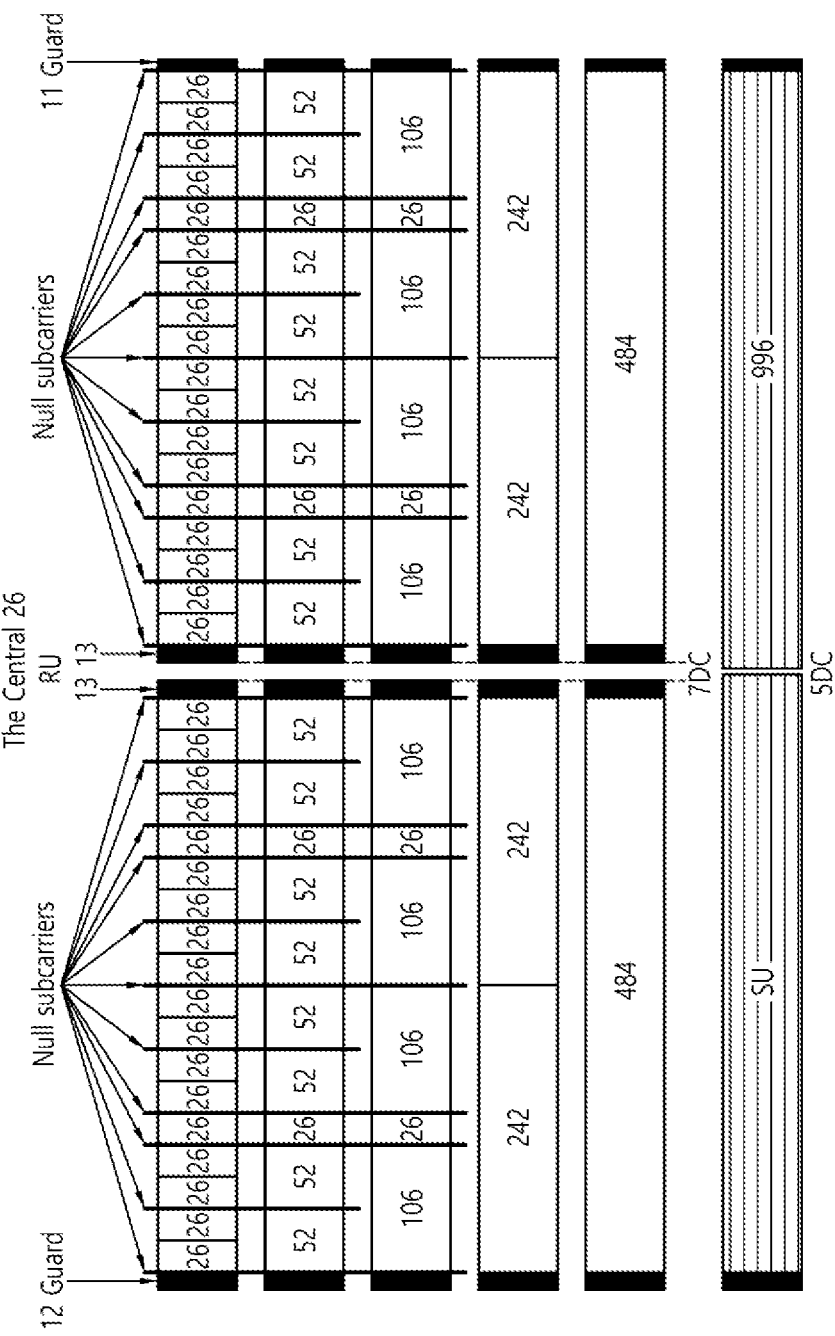
FIG. 6 illustrates a layout of RUs used in a band of 80 MHz.

FIG. 6 illustrates a layout of RUs used in a band of 80 MHz.

Similar to FIG. 4 and FIG. 5 in which RUs having various sizes are used, a 26-RU, a 52-RU, a 106-RU, a 242-RU, a 484-RU, a 996-RU, and the like may be used in an example of FIG. 6. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 7:
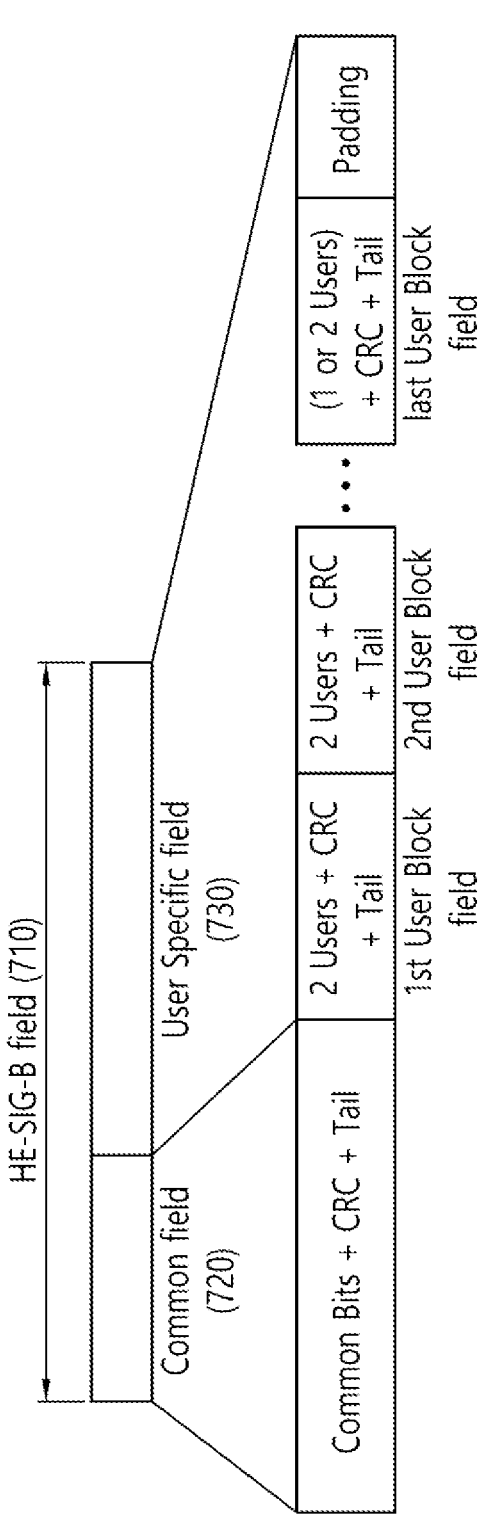
FIG. 7 illustrates a structure of an HE-SIG-B field.

FIG. 7 illustrates a structure of an HE-SIG-B field.

As illustrated, an HE-SIG-B field 710 includes a common field 720 and a user-specific field 730. The common field 720 may include information commonly applied to all users (i.e., user STAs) which receive SIG-B. The user-specific field 730 may be called a user-specific control field. When the SIG-B is transferred to a plurality of users, the user-specific field 730 may be applied only any one of the plurality of users.

As illustrated, the common field 720 and the user-specific field 730 may be separately encoded.

The common field 720 may include RU allocation information of N*8 bits. For example, the RU allocation information may include information related to a location of an RU. For example, when a 20 MHz channel is used as shown in FIG. 4, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |  | 1 |
| 00000010 | 26 | 26 | 26 | 26 | 26 | 52 |  | 26 | 26 | 1 |
| 00000011 | 26 | 26 | 26 | 26 | 26 | 52 |  | 52 |  | 1 |
| 00000100 | 26 | 26 | 52 |  | 26 | 26 | 26 | 26 |  | 1 |
| 00000101 | 26 | 26 | 52 |  | 26 | 26 | 26 | 52 |  | 1 |
| 00000110 | 26 | 26 | 52 |  | 26 | 52 |  | 26 | 26 | 1 |
| 00000111 | 26 | 26 | 52 |  | 26 | 52 |  | 52 |  | 1 |
| 00001000 | 52 |  | 26 | 26 | 26 | 26 | 26 | 26 | 26 | 1 |

As shown the example of FIG. 4, up to nine 26-RUs may be allocated to the 20 MHz channel. When the RU allocation information of the common field 720 is set to "00000000" as shown in Table 1, the nine 26-RUs may be allocated to a corresponding channel (i.e., 20 MHz). In addition, when the RU allocation information of the common field 720 is set to "00000001" as shown in Table 1, seven 26-RUs and one 52-RU are arranged in a corresponding channel. That is, in the example of FIG. 4, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $01000y_2y_1y_0$ | 106 |  |  |  | 26 | 26 | 26 | 26 | 26 | 8 |
| $01001y_2y_1y_0$ | 106 |  |  |  | 26 | 26 | 26 | 52 |  | 8 |

"$01000y2y1y0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 7, the user-specific field 730 may include a plurality of user fields. As described above, the number of STAs (e.g., user STAs) allocated to a specific channel may be determined based on the RU allocation information of the common field 720. For example, when the RU allocation information of the common field 720 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 8.

allocated to the 106-RU through the MU-MIMO scheme. As a result, since eight user STAs are allocated, the user-specific field 730 of HE-SIG-B may include eight user fields.

Figure 9:
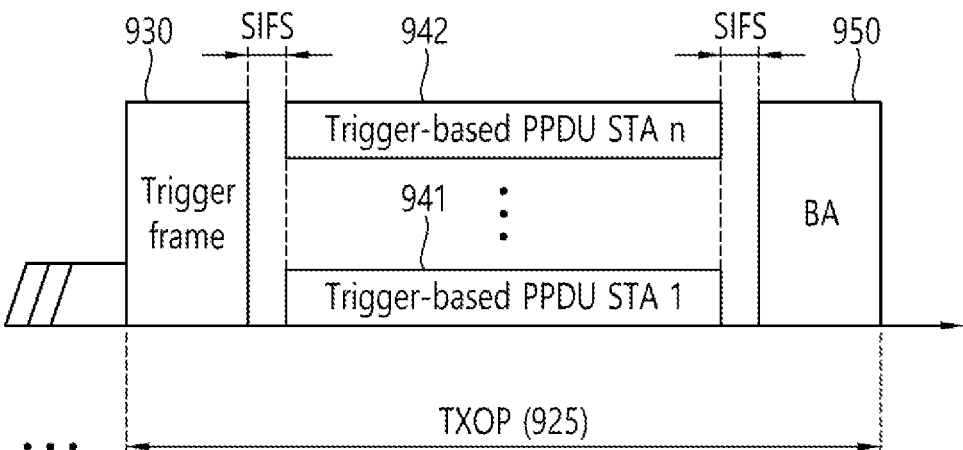
FIG. 9 illustrates an operation based on UL-MU.

The eight user fields may be expressed in the order shown in FIG. 9. In addition, as shown in FIG. 7, two user fields may be implemented with one user block field.

Figure 8:
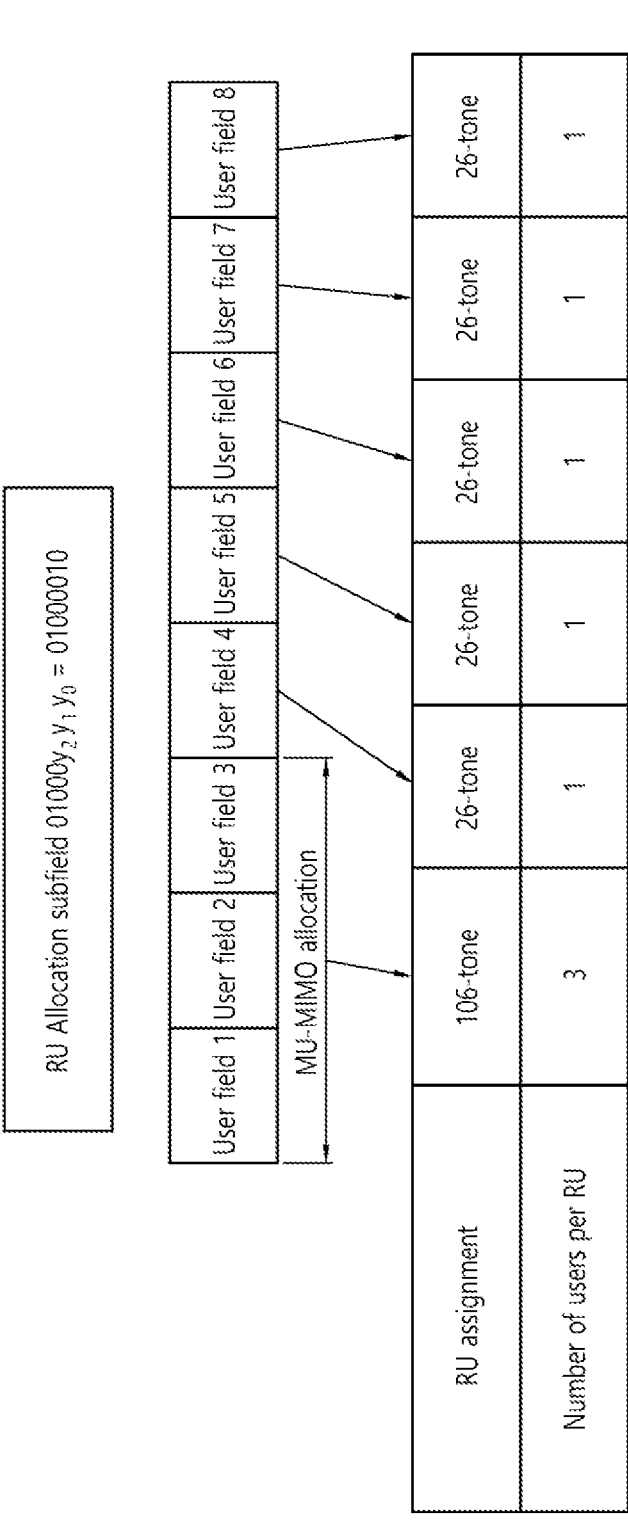
FIG. 8 illustrates an example in which a plurality of user STAs are allocated to the same RU through a MU-MIMO scheme.

The user fields shown in FIG. 7 and FIG. 8 may be configured based on two formats. That is, a user field related to a MU-MIMO scheme may be configured in a first format, and a user field related to a non-MIMO scheme may be configured in a second format. Referring to the example of FIG. 8, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
| | 0100-0110 | 2-4 | 2 | | | | | | | 4-6 | |
| | 0111-1000 | 3-4 | 3 | | | | | | | 6-7 | |
| | 1001 | 4 | 4 | | | | | | | 8 | |
| 3 | 0000-0011 | 1-4 | 1 | 1 | | | | | | 3-6 | 13 |
| | 0100-0110 | 2-4 | 2 | 1 | | | | | | 5-7 | |
| | 0111-1000 | 3-4 | 3 | 1 | | | | | | 7-8 | |
| | 1001-1011 | 2-4 | 2 | 2 | | | | | | 6-8 | |
| | 1100 | 3 | 3 | 2 | | | | | | 8 | |
| 4 | 0000-0011 | 1-4 | 1 | 1 | 1 | | | | | 4-7 | 11 |
| | 0100-0110 | 2-4 | 2 | 1 | 1 | | | | | 6-8 | |
| | 0111 | 3 | 3 | 1 | 1 | | | | | 8 | |
| | 1000-1001 | 2-3 | 2 | 2 | 1 | | | | | 7-8 | |
| | 1010 | 2 | 2 | 2 | 2 | | | | | 8 | |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
| | 0100-0101 | 2-3 | 2 | 1 | 1 | 1 | | | | 7-8 | |
| | 0110 | 2 | 2 | 2 | 1 | 1 | | | | 8 | |
| 6 | 0000-0010 | 1-3 | 1 | 1 | 1 | 1 | 1 | | | 6-8 | 4 |
| | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

FIG. 8 illustrates an example in which a plurality of user STAs are allocated to the same RU through a MU-MIMO scheme.

For example, when RU allocation is set to "01000010" as shown in FIG. 7, a 106-RU may be allocated to the leftmost side of a specific channel, and five 26-RUs may be allocated to the right side thereof. In addition, three user STAs may be As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 8, N user is set to "3". Therefore, values of N_STS[1], N_STS[2], and N_STS

[3] may be determined as shown in Table 3. For example, when a value of the second bit (B11-B14) is "0011", it may be set to N_STS[1]=4, N_STS[2]=1, N_STS[3]=1. That is, in the example of FIG. 8, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

FIG. 9 illustrates an operation based on UL-MU. As illustrated, a transmitting STA (e.g., AP) may perform channel access through contending (e.g., a backoff operation), and may transmit a trigger frame 930. That is, the transmitting STA may transmit a PPDU including the trigger frame 930. Upon receiving the PPDU including the trigger frame, a trigger-based (TB) PPDU is transmitted after a delay corresponding to SIFS.

TB PPDUs 941 and 942 may be transmitted at the same time period, and may be transmitted from a plurality of STAs (e.g., user STAs) having AIDs indicated in the trigger frame 930. An ACK frame 950 for the TB PPDU may be implemented in various forms.

Figure 10:
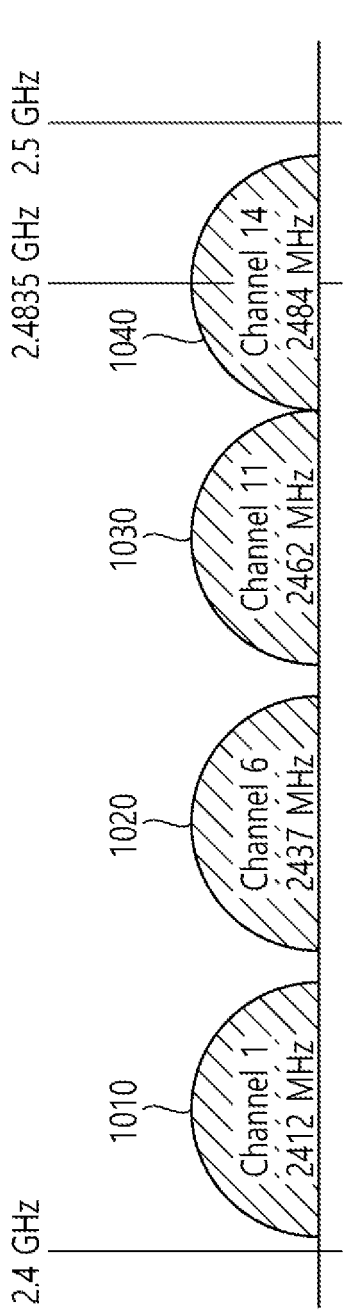
FIG. 10 illustrates an example of a channel used/supported/defined within a 2.4 GHz band.

FIG. 10 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be $(2.407+0.005*N)$ GHz. The channel index may be called in various terms such as a channel number or the like. Specific numerical values of the channel index and center frequency may be changed.

FIG. 10 exemplifies 4 channels within a 2.4 GHz band. Each of 1st to 4th frequency domains 1010 to 1040 shown herein may include one channel. For example, the 1st frequency domain 1010 may include a channel 1 (a 20 MHz channel having an index 1). In this case, a center frequency of the channel 1 may be set to 2412 MHz. The 2nd frequency domain 1020 may include a channel 6. In this case, a center frequency of the channel 6 may be set to 2437 MHz. The 3rd frequency domain 1030 may include a channel 11. In this case, a center frequency of the channel 11 may be set to 2462 MHz. The 4th frequency domain 1040 may include a channel 14. In this case, a center frequency of the channel 14 may be set to 2484 MHz.

Figure 11:
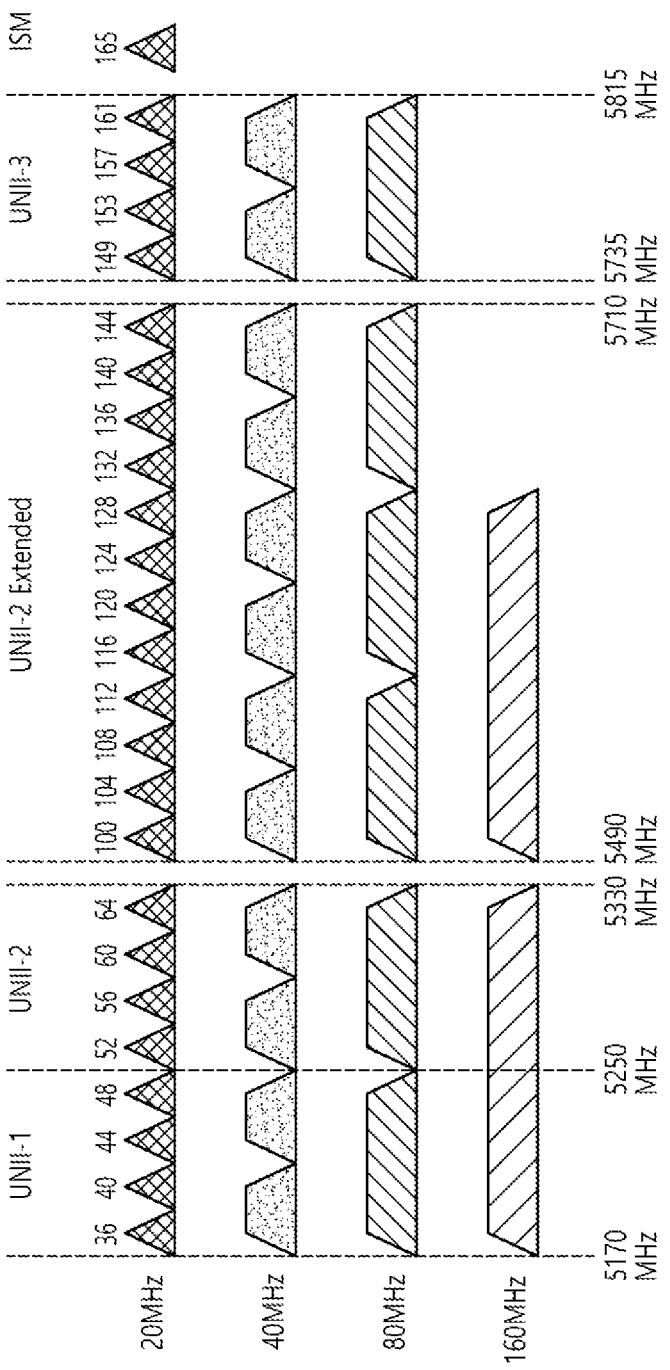
FIG. 11 illustrates an example of a channel used/supported/defined within a 5 GHz band.

FIG. 11 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 11 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be classified into eight 20 MHz channels. The 5170 MHz to 5330 MHz frequency domains/ranges may be classified into four channels through a 40 MHz frequency domain. The 5170 MHz to 5330 MHz frequency domains/ranges may be classified into two channels through an 80 MHz frequency domain. Alternatively, the 5170 MHz to 5330 MHz frequency domains/ranges may be classified into one channel through a 160 MHz frequency domain.

Figure 12:
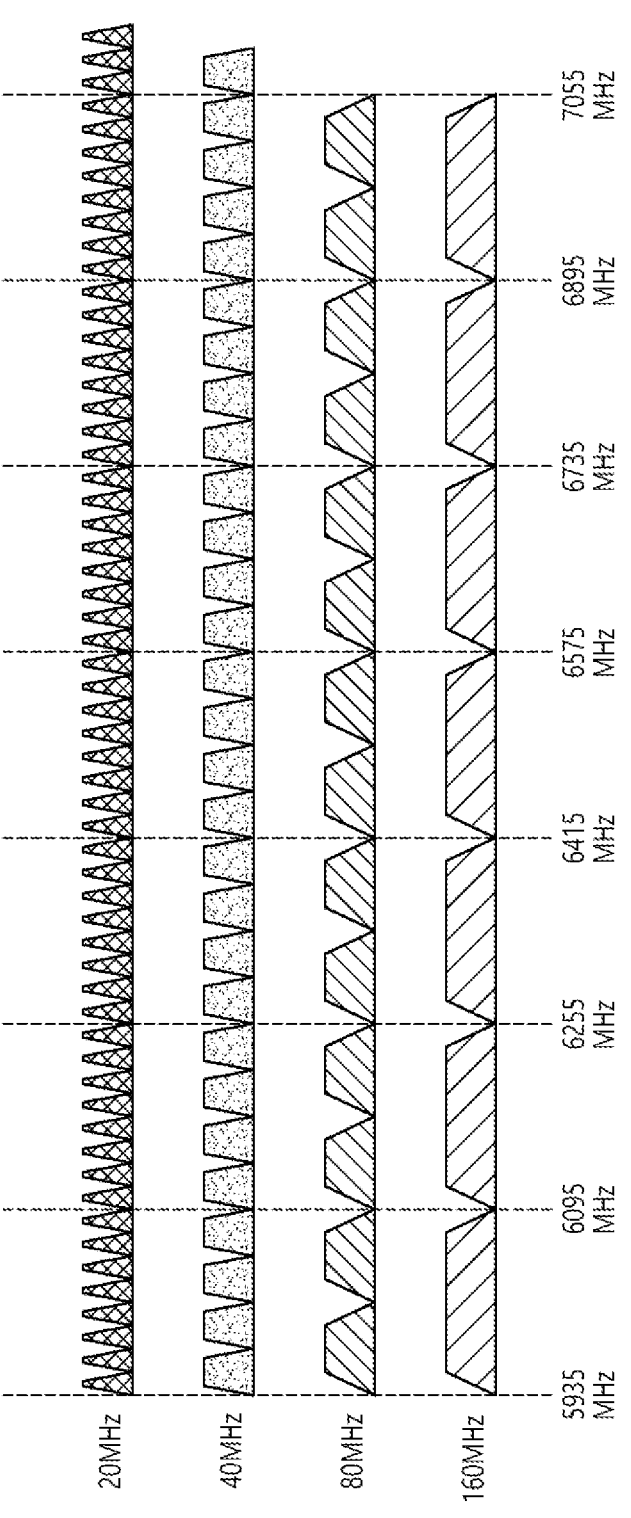
FIG. 12 illustrates an example of a channel used/supported/defined within a 6 GHz band.

FIG. 12 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 12 may be changed.

For example, the 20 MHz channel of FIG. 12 may be defined starting from 5.940 GHz. Specifically, among 20 MHz channels of FIG. 12, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 12 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 13 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 12, a 240 MHz channel or a 320 MHz channel may be additionally added.

Hereinafter, a PPDU transmitted/received in an STA of the present specification will be described.

Figure 13:
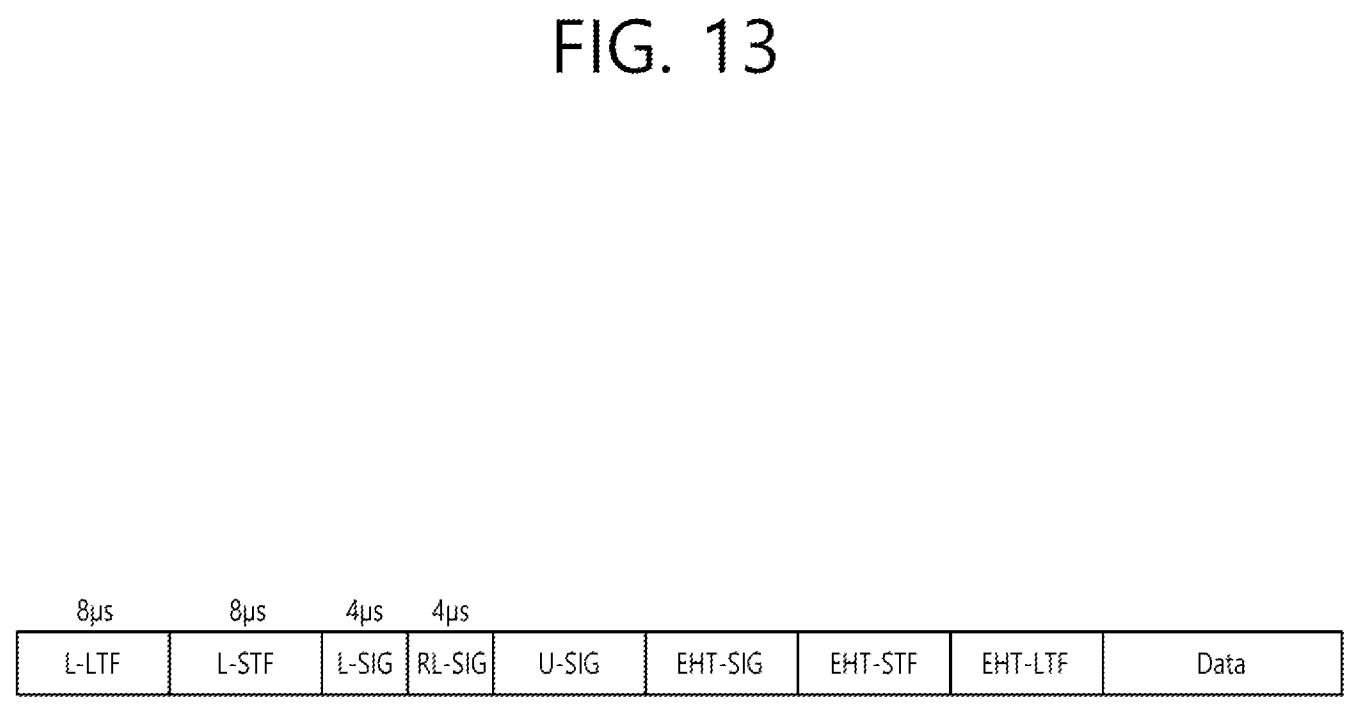

FIG. 13 illustrates an example of a PPDU used in the present specification.

The PPDU of FIG. 13 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

Figure 14:
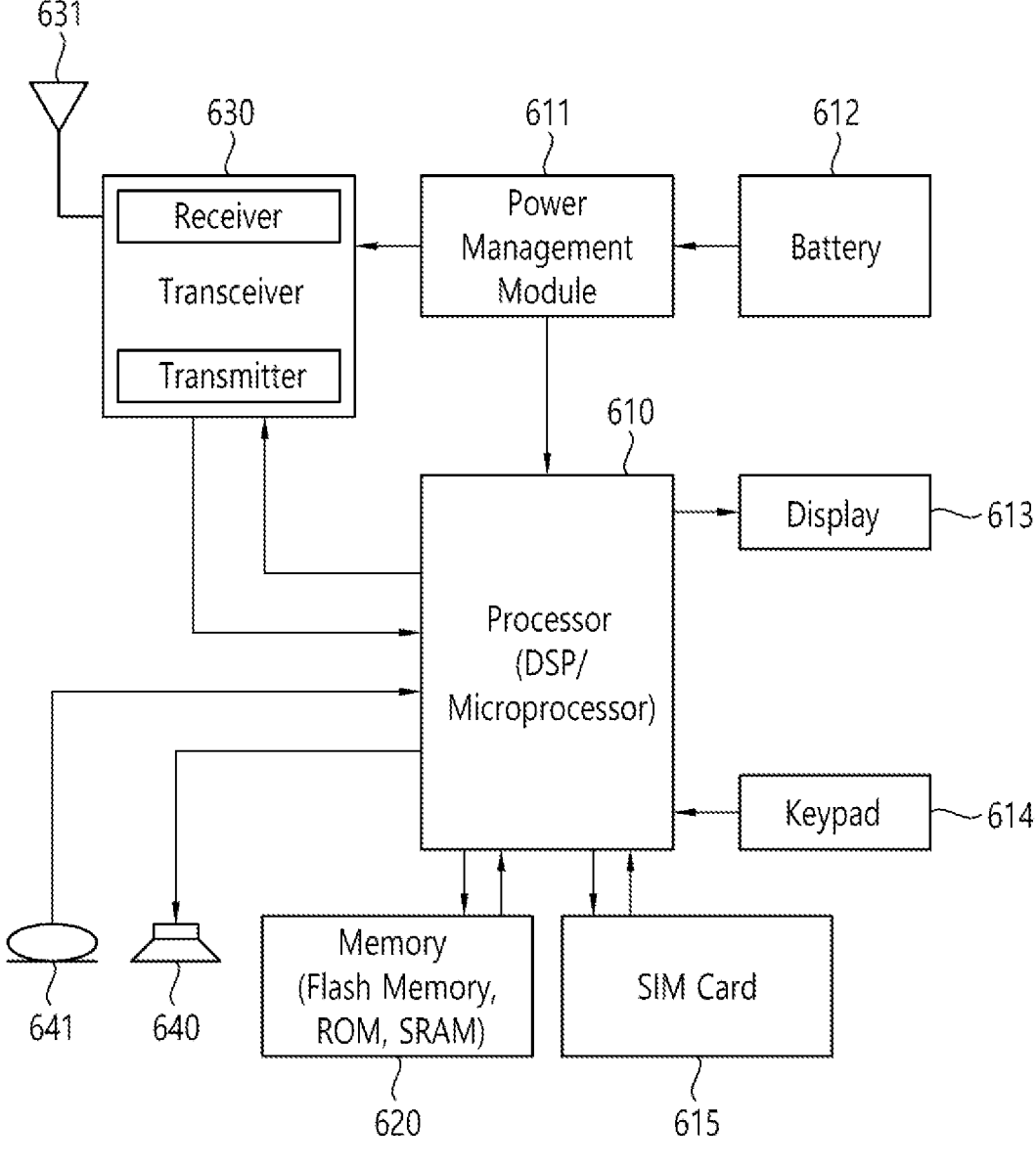
FIG. 14 illustrates an example of a modified transmission device and/or receiving device of the present specification.

The PPDU of FIG. 13 may indicate the entirety or part of a PPDU type used in the EHT system. For example, the example of FIG. 13 may be used for both of a single-user (SU) mode and a multi-user (MU) mode. In other words, the PPDU of FIG. 13 may be a PPDU for one receiving STA or a plurality of receiving STAs. When the PPDU of FIG. 14 is used for a trigger-based (TB) mode, the EHT-SIG of FIG. 13 may be omitted. In other words, an STA which has received a trigger frame for uplink-MU (UL-MU) may transmit the PPDU in which the EHT-SIG is omitted in the example of FIG. 13.

In FIG. 13, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 13 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 13, the L-LTF and the L-STF may be the same as those in the conventional fields.

The L-SIG field of FIG. 13 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation in the frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 13. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, '000000'.

The A-bit information (e.g., 52 un-coded bits) transmitted by the U-SIG (or U-SIG field) may be classified into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is classified into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information related to whether a dual subcarrier modulation (DCM) scheme is applied to EHT-SIG; 4) a field including information related to the number of symbol used for EHT-SIG; 5) a field including information related to whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 13. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 13 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 7 and FIG. 8. For example, the EHT-SIG may include a common field and a user-specific field as in the example of FIG. 7. The common field of the EHT-SIG may be omitted, and the number of user-specific fields may be determined based on the number of users.

As with the example in FIG. 7, the EHT-SIG common fields and the EHT-SIG user-specific fields may be coded separately. It is possible that one User block field included in the User-specific field may contain information for two users, while the last User block field included in the User-specific field may contain information for one user. In the EHT specification, the above user block fields may be referred to by various names. For example, user encoding block field, user field, etc. may be used, i.e., one user block field in the EHT-SIG may contain up to two user fields. As with the example in FIG. 8, each user field may be related with a MU-MIMO assignment or a non-MU-MIMO assignment.

As in the example of FIG. 7, the common field of the EHT-SIG may include a CRC bit and a tail bit. A length of the CRC bit may be determined as 4 bits. A length of the tail bit may be determined as 6 bits, and may be set to '000000'.

As in the example of FIG. 7, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 |  | 1 |
| 2 | 26 | 26 | 26 | 26 | 26 | 52 |  | 26 | 26 | 1 |
| 3 | 26 | 26 | 26 | 26 | 26 | 52 |  | 52 |  | 1 |
| 4 | 26 | 26 | 52 |  | 26 | 26 | 26 | 26 | 26 | 1 |
| 5 | 26 | 26 | 52 |  | 26 | 26 | 26 | 52 |  | 1 |
| 6 | 26 | 26 | 52 |  | 26 | 52 |  | 26 | 26 | 1 |
| 7 | 26 | 26 | 52 |  | 26 | 52 |  | 52 |  | 1 |
| 8 | 52 |  | 26 | 26 | 26 | 26 | 26 | 26 | 26 | 1 |
| 9 | 52 |  | 26 | 26 | 26 | 26 | 26 | 52 |  | 1 |
| 10 | 52 |  | 26 | 26 | 26 | 52 |  | 26 | 26 | 1 |
| 11 | 52 |  | 26 | 26 | 26 | 52 |  | 52 |  | 1 |
| 12 | 52 |  | 52 |  | 26 | 26 | 26 | 26 | 26 | 1 |
| 13 | 52 |  | 52 |  | 26 | 26 | 26 | 52 |  | 1 |
| 14 | 52 |  | 52 |  | 26 | 52 |  | 26 | 26 | 1 |
| 15 | 52 |  | 52 |  | 26 | 52 |  | 52 |  | 1 |
| 16 | 26 | 26 | 26 | 26 | 26 | 106 |  |  |  | 1 |
| 17 | 26 | 26 | 52 |  | 26 | 106 |  |  |  | 1 |
| 18 | 52 |  | 26 | 26 | 26 | 106 |  |  |  | 1 |
| 19 | 52 |  | 52 |  | 26 | 106 |  |  |  | 1 |

TABLE 6

| Indices | #1 | #2 | #3 | #4 | #5 | #6 | #7 | #8 | #9 | Number of entries |
|---|---|---|---|---|---|---|---|---|---|---|
| 20 |  | 106 |  |  | 26 | 26 | 26 | 26 | 26 | 1 |
| 21 |  | 106 |  |  | 26 | 26 | 26 | 52 |  | 1 |
| 22 |  | 106 |  |  | 26 | 52 |  | 26 | 26 | 1 |
| 23 |  | 106 |  |  | 26 | 52 |  | 52 |  | 1 |
| 24 | 52 |  | 52 |  | — | 52 |  | 52 |  | 1 |
| 25 |  | 242-tone RU empty (with zero users) |  |  |  |  |  |  |  | 1 |
| 26 |  | 106 |  |  | 26 |  | 106 |  |  | 1 |
| 27-34 |  |  |  | 242 |  |  |  |  |  | 8 |
| 35-42 |  |  |  | 484 |  |  |  |  |  | 8 |
| 43-50 |  |  |  | 996 |  |  |  |  |  | 8 |
| 51-58 |  |  |  | 2*996 |  |  |  |  |  | 8 |
| 59 | 26 | 26 | 26 | 26 | 26 | 52 + 26 |  |  | 26 | 1 |
| 60 | 26 | 26 + 52 |  |  | 26 | 26 | 26 | 26 | 26 | 1 |
| 61 | 26 | 26 + 52 |  |  | 26 | 26 | 26 | 52 |  | 1 |
| 62 | 26 | 26 + 52 |  |  | 26 | 52 |  | 26 | 26 | 1 |
| 63 | 26 | 26 | 52 |  | 26 | 52 + 26 |  |  | 26 | 1 |
| 64 | 26 | 26 + 52 |  |  | 26 | 52 + 26 |  |  | 26 | 1 |
| 65 | 26 | 26 + 52 |  |  | 26 | 52 |  | 52 |  | 1 |

TABLE 7

| Indices | #1 | #2 | #3 | #4 | #5 | #6 | #7 | #8 | #9 | Number of entries |
|---|---|---|---|---|---|---|---|---|---|---|
| 66 | 52 |  | 26 | 26 | 26 | 52 + 26 |  |  | 26 | 1 |
| 67 | 52 |  | 52 |  | 26 | 52 + 26 |  |  | 26 | 1 |
| 68 | 52 |  | 52 + 26 |  |  | 52 |  | 52 |  | 1 |
| 69 | 26 | 26 | 26 | 26 | 26 + 106 |  |  |  |  | 1 |
| 70 | 26 | 26 + 52 |  |  | 26 | 106 |  |  |  | 1 |
| 71 | 26 | 26 | 52 |  | 26 + 106 |  |  |  |  | 1 |
| 72 | 26 | 26 + 52 |  |  | 26 + 106 |  |  |  |  | 1 |
| 73 | 52 |  | 26 | 26 | 26 + 106 |  |  |  |  | 1 |
| 74 | 52 |  | 52 |  | 26 + 106 |  |  |  |  | 1 |
| 75 | 106 + 26 |  |  |  |  | 26 | 26 | 26 | 26 | 1 |
| 76 | 106 + 26 |  |  |  |  | 26 | 26 | 52 |  | 1 |
| 77 | 106 + 26 |  |  |  |  | 52 |  | 26 | 26 | 1 |
| 78 | 106 |  |  |  | 26 | 52 + 26 |  |  | 26 | 1 |
| 79 | 106 + 26 |  |  |  |  | 52 + 26 |  |  | 26 | 1 |
| 80 | 106 + 26 |  |  |  |  | 52 |  | 52 |  | 1 |
| 81 | 106 + 26 |  |  |  |  | 106 |  |  |  | 1 |
| 82 | 106 |  |  |  | 26 + 106 |  |  |  |  | 1 |

MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 13 may be used for improving automatic gain control estimation in a multiple input multiple output (MIMO) environment or an OFDMA environment. An HE-LTF of FIG. 13 may be used for estimating a channel in the MIMO environment or the OFDMA environment.

A PPDU (e.g., EHT-PPDU) of FIG. 13 may be configured based on the example of FIG. 4 and FIG. 5.

For example, an EHT PPDU transmitted on a 20 MHz band, i.e., a 20 MHz EHT PPDU, may be configured based on the RU of FIG. 4. That is, a location of an RU of EHT-STF, EHT-LTF, and data fields included in the EHT PPDU may be determined as shown in FIG. 4.

An EHT PPDU transmitted on a 40 MHz band, i.e., a 40 MHz EHT PPDU, may be configured based on the RU of FIG. 5. That is, a location of an RU of EHT-STF, EHT-LTF, and data fields included in the EHT PPDU may be determined as shown in FIG. 5.

Since the RU location of FIG. 5 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 6 but the RU of FIG. 5 is repeated twice.

When the pattern of FIG. 5 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 5 is repeated several times.

The PPDU of FIG. 13 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 13. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2."

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BP SK symbol; and 2) when RL-SIG in which L-SIG is repeated is not detected. In addition, even if the receiving STA detects that the RL-SIG is repeated, when a result of applying "modulo 3" to the length value of the L-SIG is detected as "0," the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 13. The PPDU of FIG. 13 may be used to transmit/receive frames of various types. For example, the PPDU of FIG. 13 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 14 may be used for a management frame. An example of the management frame may include a beacon frame, a (re-)association request frame, a (re-)association response frame, a probe request frame, and a probe response frame. For example, the PPDU of FIG. 13 may be used for a data frame. For example, the PPDU of FIG. 13 may be used to simultaneously transmit at least two or more of the control frame, the management frame, and the data frame.

FIG. 14 illustrates an example of a modified transmission device and/or receiving device of the present specification.

Figure 15:
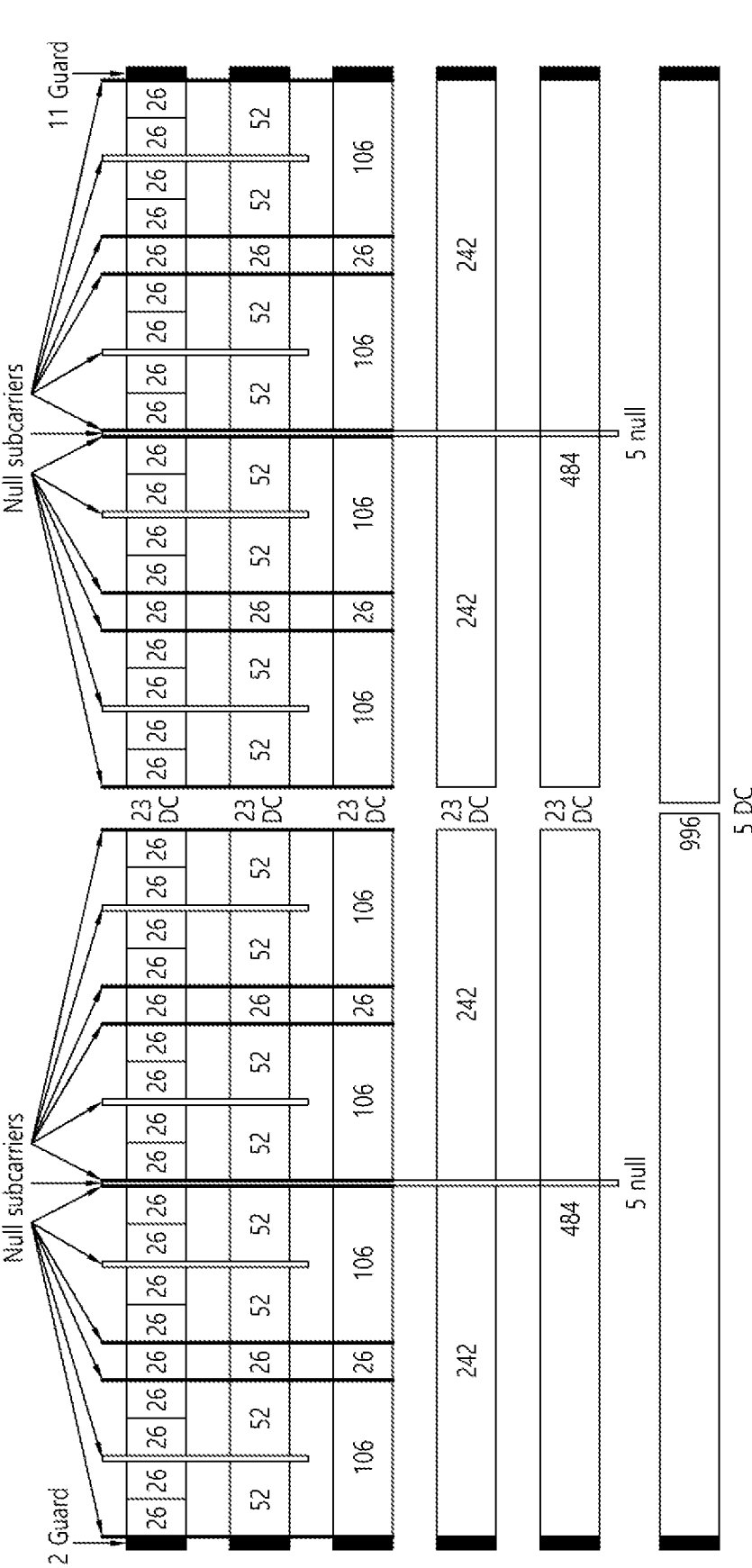
FIG. 15 is a diagram illustrating the placement of resource units (RUs) used in the 80 MHz band.

Each device/STA of the sub-figure (a)/(b) of FIG. 1 may be modified as shown in FIG. 15. A transceiver 630 of FIG. 14 may be identical to the transceivers 113 and 123 of FIG. 1. The transceiver 630 of FIG. 14 may include a receiver and a transmitter.

A processor 610 of FIG. 14 may be identical to the processors 111 and 121 of FIG. 1. Alternatively, the processor 610 of FIG. 14 may be identical to the processing chips 114 and 124 of FIG. 1.

A memory 620 of FIG. 14 may be identical to the memories 112 and 122 of FIG. 1. Alternatively, the memory 620 of FIG. 14 may be a separate external memory different from the memories 112 and 122 of FIG. 1.

Referring to FIG. 14, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 14, a speaker 640 may output a result related to a sound processed by the processor 610. A microphone 641 may receive an input related to a sound to be used by the processor 610.

FIG. 15 is a diagram illustrating an arrangement of resource units (RUs) used in the 80 MHz band. The arrangement of resource units (RUs) used herein may vary. For example, the arrangement of the resource units (RUs) used in the 80 MHz band can be varied. For example, the arrangement of resource units (RUs) used in the 80 MHz band may be configured based on FIG. 15 rather than FIG. 6.

Configuration of the EHT PPDU

To support transmission methods based on the EHT specification, a new frame format may be utilized. When the new frame format is used to transmit signals in the 2.4/5/6 GHz band, convention Wi-Fi receivers (or STAs) (e.g., receivers based on the 802.11n/ac/ax standard), as well as receivers that support the EHT standard, may receive EHT signals transmitted in the 2.4/5/6 GHz band.

The preamble of a PPDU based on the EHT specification may be configured in various ways. In the following, an embodiment in which the preamble of a PPDU based on the EHT specification is configured may be described. In the following, a PPDU based on the EHT specification may be described as an EHT PPDU. However, an EHT PPDU is not limited to the EHT specification. EHT PPDUs may include PPDUs based on the 802.11be specification (i.e., the EHT specification) as well as PPDUs based on new specifications that advance, evolve, or extend the 802.11be specification.

Figure 16:
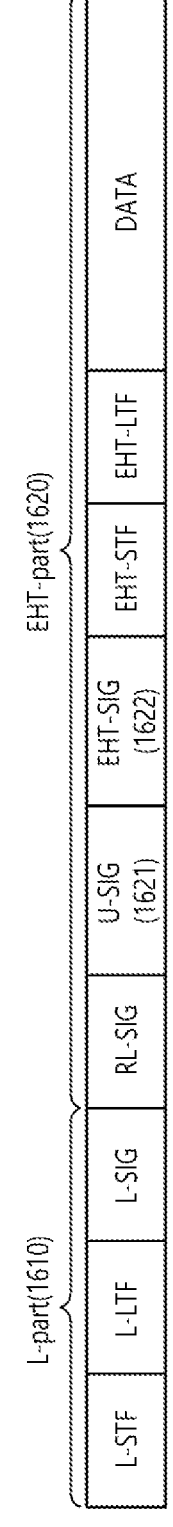
FIG. 16 illustrates an example of an EHT PPDU.

FIG. 16 shows an example of an EHT PPDU.

Referring to FIG. 16, the EHT PPDU 1600 may include an L-part 1610 and an EHT-part 1620. The EHT PPDU 1600 may be configured in a format to support backward compatibility. Further, the EHT PPDU 1600 may be transmitted to a single STA and/or multiple STAs. The EHT PPDU 1600 may be an example of an EHT-compliant MU-PPDU.

The EHT PPDU 1600 may be structured such that the L-part 1610 is transmitted first before the EHT-part 1620 for coexistence or backward compatibility with legacy STAs (STAs according to 802.11n/ac/ax specifications). For example, L-part 1610 may include L-STF, L-LTF, and L-SIG. For example, phase rotation may be applied to L-part 1610.

According to one embodiment, EHT part 1620 may include RL-SIG, U-SIG 1621, EHT-SIG 1622, EHT-STF, EHT-LTF, and data fields. Similar to the 11ax specification, an RL-SIG may be included in the EHT part 1620 to extend the reliability and range of the L-SIG. The RL-SIG may be transmitted immediately after the L-SIG and may be configured to repeat the L-SIG.

For example, four extra subcarriers may be applied to the L-SIG and RL-SIG. The extra subcarriers may be configured as [−28, −27, 27, 28]. The extra subcarriers may be modulated in a BPSK fashion. Further, the extra subcarriers may be mapped with coefficients of [−1 −1 −1 1].

For example, an EHT-LTF may be configured as one of 1×EHT-LTF, 2×EHT-LTF, or 4×EHT-LTF. The EHT specification can support EHT-LTFs for 16 spatial streams.

Each of the fields in FIG. 16 may be the same as each of the fields described in FIG. 13.

In the following, the first control signal field (e.g., the U-SIG field) and the second control signal field (e.g., the EHT-SIG field) are specifically described.

Control information that is not included in the first control signal field (e.g., U-SIG field) may be referred to by various names, such as overflowed information or overflow information. The second control signal field (e.g., the EHT-SIG field) may include a common field and a user specific field. Each of the common field and the user specific field may include at least one encoding block (e.g., a binary convolutional code (BCC) encoding block). One encoding block may be transmitted/received via at least one symbol, and one encoding block may not necessarily be transmitted via one symbol. One symbol transmitting an encoding block may have a symbol length of 4 μs.

The transmit/receive PPDUs proposed herein may be used for communications for at least one user. For example, the technical features of this specification may be applied to MU-PPDUs (e.g., EHT MU PPDUs) according to the 11be standard.

Figures 17, 18, 19:
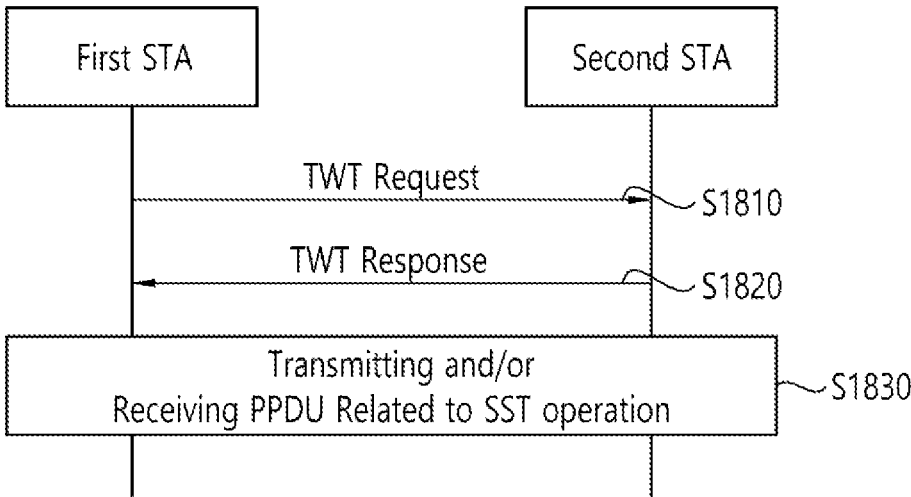
FIG. 17 illustrates an example of a first control signal field or U-SIG field of the present disclosure.
FIG. 18 is a flow chart illustrating an example of the present disclosure.
FIG. 19 illustrates an example of a TWT channel field.

FIG. 17 illustrates an example of a first control signal field or U-SIG field of the present disclosure.

As shown, the first control signal field (e.g., the U-SIG field) may include a version independent field 1710 and a version dependent field 1720. For example, the version independent field 1710 may include control information that is consistently included regardless of the version of the wireless LAN (e.g., IEEE 802.11be, and the next generation standard of IEEE 802.11be). For example, the version dependent field 1720 may include control information that is dependent on the version (e.g., IEEE 802.11be specification).

For example, version independent field 1710 may include a 3-bit version identifier indicating 11be and later Wi-Fi versions, a 1-bit DL/UL field BSS color, and/or information related to TXOP duration. For example, version dependent field 1720 may include information related to PPDU format type, and/or Bandwidth, MCS.

For example, the first control signal field (e.g., U-SIG field) shown in FIG. 17 may be jointly encoded by two symbols (e.g., two contiguous 4 μs long symbols). Further, the field of FIG. 17 may be configured based on 52 data tones and 4 pilot tones for each 20 MHz band/channel. Further, the field of FIG. 17 may be modulated in the same manner as HE-SIG-A in the prior art 11ax standard. In other words, the fields of FIG. 17 may be modulated based on a BPSK 1/2 code rate.

For example, the second control signal field (e.g., EHT-SIG field) may be classified into a common field and a user specific field, and may be encoded based on different MCS levels. For example, the common field may include indicative information related to the spatial stream used in the transmit/receive PPDU (e.g., data field) and indicative information related to the RU. For example, the user specific field may include indicative information related to ID information, MCS, coding used by at least one specific user (or receiving STA). Stated differently, the user specific field may include decoding information (e.g., STA ID information, MSC information, and/or channel coding type/rate information) for data fields transmitted via at least one RU as indicated by the RU allocation sub-field included in the common field.

The first control signal field or U-SIG field described above may be transmitted via two contiguous symbols. In other words, the U-SIG field may comprise a first U-SIG signal transmitted via the first symbol and a second U-SIG signal transmitted via the second symbol. Each of the first U-SIG signal and the second U-SIG signal may be configured based on 26 bits of control information.

For example, the first U-SIG signal may be configured based on 26 bits of control information including bits B0 through B25. An example of bits B0 through B25 for the first U-SIG signal is shown below. The fields (or subfields) listed in Table 8 may fall into the category of Version independent.

As described in Table 8, bits B0 to B2 of the first U-SIG signal may include information related to the PHY Version of the PPDU via 3 bits of information. B3 bits to B5 bits of the first U-SIG signal may include information related to the bandwidth of the transmitted/received PPDU via 3 bits of information. Bit B6 of the first U-SIG signal may include information related to whether the transmitted/received PPDU is for UL or DL communication. Bits B7 to B12 of the first U-SIG signal may include information related to the BSS Color ID of the transmitted/received PPDU. The information related to the BSS Color ID may be used to identify whether the transmitted/received PPDU is an intra-PPDU or an inter-PPDU. Bits B13 to B19 of the first U-SIG signal may include information related to the duration of the TXOP of the transmitted/received PPDU. Bits B20 to B24 of the first U-SIG signal may be reserved bits and may be ignored by the receiving STA. Bit B25 of the first U-SIG signal is a reserved bit and may be related to the termination of the receive operation of the receiving STA.

TABLE 8

| Bit | Field | Number of bits |
|---|---|---|
| B0-B2 | PHY Version Identifier | 3 |
| B3-B5 | Bandwidth | 3 |
| B6 | UL/DL | 1 |
| B7-B12 | BSS Color | 6 |
| B13-B19 | TXOP | 7 |
| B20-B24 | Disregard | 5 |
| B25 | Validate | 1 |

For example, the second U-SIG signal may be configured based on 26 bits of control information including bits B0 through B25. An example of bits B0 through B25 for the second U-SIG signal is shown below. Bits B0 to B 15 of the fields (or subfields) listed in Table 9 may belong to the Version dependent category. Bits B0 to B1 of the second U-SIG signal may contain information related to whether the transmitted/received PPDU is used for DL OFDMA communication, DL MU-MIMO communication, SU or NDP communication, etc. Bits B2 and B8 of the second U-SIG signal are reserved bits and may relate to the termination of the receive operation of the receiving STA. Bits B3 through B7 of the second U-SIG signal may contain information related to a puncturing pattern applied to the transmitted/received PPDU. Bits B9 through B10 of the second U-SIG signal may include information for an MCS technique applied to the EHT-SIG field. Bits B11 to B15 of the second U-SIG signal may include information related to the number of symbols used to transmit the EHT-SIG field. Bits B16 through B19 of the second U-SIG signal may comprise a CRC field for the U-SIG field. the CRC field may be calculated based on bits B0 to B25 of the first U-SIG signal and bits B0 to B15 of the second U-SIG signal. Bit B25 of the second U-SIG signal may be set to zero as a tail bit.

TABLE 9

| Bit | Field | Number of bits |
|---|---|---|
| B0-B1 | PPDU Type And Compression Mode | 2 |
| B2 | Validate | 1 |

TABLE 9-continued

| Bit | Field | Number of bits |
|---|---|---|
| B3-B7 | Punctured Channel Information | 5 |
| B8 | Validate | 1 |
| B9-B10 | EHT-SIG MCS | 2 |
| B11-B15 | Number Of EHT-SIG Symbols | 5 |
| B16-B19 | CRC | 4 |
| B20-B25 | Tail | 6 |

The second signal field (e.g., the EHT-SIG) may be classified into a common field and a user specific field. For example, the common field may comprise RU allocation information. For example, the user specific field may include at least one user encoding block field (or at least one user field) containing information related to the user (i.e., the receiving STA). The EHT-SIG may be transmitted over an EHT-SIG content channel comprising 20 MHz segments, i.e., one EHT-SIG content channel may be transmitted over a 20 MHz sub-channel. For example, a PPDU with a bandwidth of 80 MHz or more may be transmitted over two EHT-SIG content channels. For example, the two EHT-SIG content channels may be referred to as EHT CC1 and EHT CC2. For example, if a PPDU is transmitted over 160 MHz, an EHT-SIG with different information may be transmitted in each of the two 80 MHz bands. An EHT-SIG transmitted over any one 80 MHz band could be transmitted over EHT CC1 and EHT CC2.

The present specification relates to a subchannel selective transmission (SST) operation. A conventional SST operation may be established based on an individual target wake time (TWT) technique.

FIG. 18 is a flow chart illustrating one example of the present disclosure.

A PPDU of the present disclosure (e.g., an EHT PPDU) may be transmitted or received via the SST operation. The PPDUs of this specification may be transmitted via downlink or uplink.

Specifically, the (transmit/receive) PPDUs of the present specification may be transmitted based on a conventional Target Wake Time Service Period (TWT SP).

Prior art WLAN standards may support multiple TWT SPs (e.g., TWT SP1, TWT SP2, ... TWT SP #n). Each TWT SP is a time period, and STAs (e.g., non-AP STAs) assigned to a particular TWT SP may remain awake for the duration of the assigned TWT SP. Information regarding the start time of a TWT SP can be negotiated through TWT Request and TWT Response. Information about the TWT channel/band/subchannel may be exchanged through the above TWT Request/Response. The TWT channel/band/subchannel may refer to a channel/band/subchannel on which a PPDU may be transmitted or received during a TWT SP.

As shown in FIG. 18, the first STA (e.g., non-AP EHT STA) may request information about the TWT SP via a TWT Request (S1810). For example, the second STA (e.g., an AP EHT STA) may respond with information about the TWT SP via a TWT Response (S1820), i.e., a TWT SP for the first STA may be determined through the transmission and reception of the TWT Request/Response, and information about the channel/band used for transmission and reception during that TWT SP may be determined.

As shown in S1830 of FIG. 18, after the transmission and reception of the TWT Request/Response has been performed, transmission and reception of PPDUs related to the SST operation may be performed. Specifically, through step S1830, PPDUs may be transmitted and received during the TWT SP. Further, via step S1830, PPDUs may be transmitted and received based on the TWT channel/band/subchannel included in steps S1810/S1820. In other words, through step S1830, the SST operation may be completed/performed.

The present disclosure proposes various technical features that improve the prior art SST operation. The SST operation of the present disclosure may include transmitting/receiving a TWT Request/Response, and may include transmitting/receiving a PPDU based on the TWT channel/band/subchannel.

The SST operation of this specification may be applied to various WLAN standards, including EHT standards. For example, the SST operation of this specification may be referred to as an EHT SST operation. For convenience, the SST operation of this specification will be referred to as the EHT SST operation. In the following examples, technical features of the SST operation are described based on various EHT STAs. However, the SST operations of this specification can be applied to various WLAN standards. For example, the EHT SST operation described below can be applied not only to the EHT standard, but also to new WLAN standards that improve/evolve EHT (e.g., EHT plus standards, etc.). In addition, the following technical features can be applied to various versions/types of STAs other than EHT STAs (AP or non-AP).

EHT SST Operation

As described above, this specification proposes an example of transmitting an EHT PPDU via SST operation. The EHT PPDU may be transmitted to the non-AP EHT STA (or AP EHT STA) over a pre-assigned sub-channel (or may be referred to by various names such as channel, band, etc.). The SST operation based on the new 11be WLAN specification may support non-AP EHT-STAs with BW capability of 80 MHz or more, as well as non-AP EHT STAs with 20 MHz only.

The SST operation based on this specification may be performed in 80 MHz units when the operating band is 160 MHz or 320 MHz. It may also support situations where the operating band is 80 MHz to support 20 MHz only non-AP EHT STAs or 20 MHz operating non-AP STAs. More specific examples are described below.

To perform the SST operations of this specification, the non-AP EHT-STA may transmit information about its operating BW (or operating BW) to the AP. The information about the operation BW may be transmitted via an EHT capability information field. The EHT capability information field may be included in the Association Request/Response. Transmitting and receiving the EHT capability information field may be performed prior to step S1810 of FIG. 18.

One example of the EHT capability information field is shown below. For example, the EHT capability information field may include various information fields, such as the first, second, and third fields shown below. Each of the following information fields may have various lengths, for example, a length of 1 bit.

[First field in EHT capability information field].

This field contains information about whether the non-AP STA supports 20 MHz operation (i.e., 20 MHz SST operation) when transmitting and receiving 80/160/320 MHz EHT PPDUs. In other words, the field may indicate information regarding support for 20 MHz (SST) operation in the 80/160/320 MHz band. If the field indicates that 20 MHz operation is supported, the non-AP STA may transmit and receive EHT PPDUs based on resource units (RUs) of 26-, 52-, 106-, and 242-tone RU sizes, and 26+52 MRU sizes. In other words, the field may contain information about whether "26-, 52-, 106-, and 242-tone RU size and 26+52 MRU size" are supported for "20 MHz operating non-AP EHT STA within 80/160/320 MHz channel width". For example, the 26+52 MRU size may refer to a Multiple RUs (MRUs) proposed for 20 MHz operation.

[Second field in EHT capability information field].

This field contains information about whether the non-AP STA supports 80 MHz operation (i.e., 80 MHz SST operation) when transmitting and receiving 160/320 MHz EHT PPDUs. In other words, the field may indicate information regarding support for 80 MHz (SST) operation in the 160/320 MHz band. If the field indicates that 80 MHz operation is supported, the non-AP STA may transmit and receive EHT PPDUs based on the 26-, 52-, 106-, 242-tone RU size, and MRU size for 80 MHz operation. In other words, the field may contain information about whether "26-, 52-, 106-, 242-tone RU size and MRU size for 80 MHz operation" are supported for "80 MHz operating non-AP EHT STA within 160/320 MHz channel width". The "MRU size for 80 MHz operation" may refer to the size of the MRU allowed for 80 MHz operation.

[Third field in EHT capability information field].

This field contains information about whether the non-AP STA supports 160 MHz operation (i.e. 160 MHz SST operation) when transmitting and receiving 320 MHz EHT PPDUs. In other words, the field may indicate information regarding support for 160 MHz (SST) operation on the 320 MHz band. If the field indicates that 160 MHz operation is supported, the non-AP STA may transmit and receive EHT PPDUs based on the 26-, 52-, 106-, 242-tone RU size, and MRU size for 160 MHz operation. In other words, the field may contain information about whether "26-, 52-, 106-, 242-tone RU size and MRU size for 160 MHz operation" are supported for "160 MHz operating non-AP EHT STA within 320 MHz channel width". The "MRU size for 160 MHz operation" may refer to the size of the MRU allowed for 160 MHz operation.

Upon receiving the EHT capability information field, the AP may determine the operating BW of the non-AP STA based on the information field regarding the operating BW contained in the EHT capability information field. For example, the operating BW support information included in the EHT capability information field may include information about the operating BW of the non-AP STA.

Techniques for determining a subchannel for an SST operation and transmitting information about the determined subchannel are described below. For example, the subchannel for the SST operation may be the TWT channel/band/subchannel described above, and information about the determined subchannel may be transmitted to the AP STA via the TWT Request described above.

For example, the non-AP EHT STA may select an optimal subchannel for the SST operation. For example, the non-AP EHT STA may perform measurements (e.g., various measurements such as clear channel assessment (CCA)) within the operation BW and select the optimal subchannel based on the measurement results. The information regarding the selected subchannel may be delivered to the AP STA via the above TWT Request. For example, the non-AP EHT STA may obtain information about the BSS BW via various management frames (e.g., beacon frames), and may perform measurements (e.g., various measurements such as CCA) based on the BSS BW.

As described above, the information regarding the subchannel may be transmitted to the AP STA via the TWT Request described above. For example, the TWT Request may include a TWT element, and the TWT element may include a TWT channel field within the TWT parameter information. The TWT channel field may include information regarding a (best/optimal) subchannel selected by the non-AP STA. The terminologies such as TWT channel field, TWT parameter information, TWT element, etc. may be changed.

For example, the TWT element and TWT parameter information may be based on FIG. 21, which is described below. For example, the TWT channel field may be based on FIG. 22, described below. For example, the TWT channel field may be embodied as the TWT Channel field 2260 of FIG. 22.

The size of the TWT channel field may be determined based on a BW of the BSS, or may be determined as one fixed size based on the maximum supported BW. The size of the TWT channel field may be varied, e.g., 80 MHz. The specific technical features involved may be as follows.

For example, if the BSS BW is 80 MHz, the TWT channel field may be a bitmap consisting of 4 bits. Each 1 bit of the bitmap (i.e., b0 bits to b4 bits) corresponds to one 20 MHz channel/subchannel within the 80 MHz (i.e., the BSS BW). Through the information (i.e., bitmap), the STA may indicate the information of the subchannel to be assigned within the 80 MHz (i.e., the BSS BW) in 20 MHz units. For example, if each 1 bit of the bitmap (i.e., b0 bit to b4 bit) has a first value (e.g., "1" or "0"), a request for allocation of a corresponding 20 MHz channel/subchannel may be indicated. The information of the subchannel may comprise puncturing information.

Additionally or alternatively, when the BSS BW is 160 MHz or 320 MHz, the bitmap included in the TWT channel field may comprise 1 bit per 20 MHz as described above. Accordingly, the TWT channel field may include a bitmap having a length of 8 bits, or a bitmap having a length of 16 bits. Additionally or alternatively, the length of the bitmap may be fixed regardless of the BSS BW. For example, in one example, the TWT channel field may always include a bitmap with a length of 16 bits, since the maximum supportable BW is 320 MHz.

Figures 20, 21, 22:
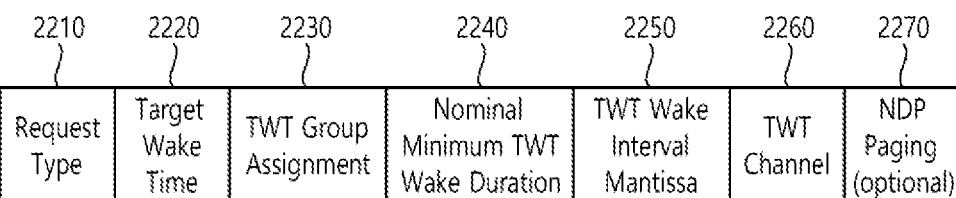
FIG. 20 illustrates another example of a TWT channel field.
FIG. 21 illustrates the structure of a TWT element of the present disclosure.
FIG. 22 illustrates the structure of the TWT Parameter Information field of this specification.

With reference to FIG. 22, the TWT channel field 2260 of FIG. 22 may include a bitmap and may have a variable length. For example, the TWT Channel field 2260 of FIG. 22 may have a length of 8 bits (i.e., 1 byte/octet) or 16 bits (i.e., 2 bytes/octet), as described above.

Technical features related to a bitmap included in a TWT channel field (e.g., TWT channel field 2260 of FIG. 22) are described below.

Technical feature 1. For example, a non-AP STA performing an SST operation may configure a bitmap with only information about the 80 MHz subchannel containing the subchannel for which the above non-AP STA is requesting allocation. In this case, the STA may set a second value (e.g., "0" or "1") for the 80 MHz of the subchannel for which it is not requesting an allocation, so as not to request that subchannel.

Technical feature 2. Additionally or alternatively, when transmitting information about a subchannel via a TWT request, the non-AP STA may transmit information (i.e., a bitmap) about the remaining 80 MHz subchannels other than the primary 80 MHz via a TWT channel field. In this case, the TWT channel field may comprise information (i.e., a bitmap) for the 20 MHz subchannel as described above. The information (i.e., bitmap) may comprise information related to the availability per 20 MHz.

Technical feature 3. The information (i.e., bitmap) of the subchannel may be fixed to 16 bit information based on the BW of the BSS (Up to 320 MHz). As described above, the subchannel information (i.e., bitmap) may be configured in 20 MHz units to indicate which subchannel (or channel information for the entire BW) is requesting assignment.

For example, the TWT channel field may comprise a bitmap configured in the following manner. For example, if the value of an individual bit of the bitmap is set to a first value (e.g., "1"), it may indicate an unwanted (or unavailable) subchannel. For example, if the value of an individual bit of the bitmap is set to a second value (e.g., "0"), it may indicate a subchannel that is desired to be used. In other words, individual bits of the bitmap may have the first value for the "punctured or not allocated" state. Further, individual bits of the bitmap may have the second value for the "allocated" state. The specific values above may change.

For example, an STA requesting allocation of a Secondary 80 MHz channel on 160 MHz may include a bitmap of 8 bits in length within the TWT channel field. In this case, all 4 MSB bits or 4 LSB bits of the bitmap may be set to "0" (or a preset value for allocated). Additionally or alternatively, the TWT channel field may be configured for each 80 MHz in such a way as to include information per 20 MHz for the 80 MHz subchannel. The subchannel information for the 80 MHz may be configured based on preamble puncturing, as shown in Table 10.

For example, the TWT channel field may comprise a bitmap comprising b0 bits to b3 bits. For example, if the bitmap is set to "1011", the second 20 MHz subchannel may not be assigned, and as a result, preamble puncturing may be requested for the second 20 MHz subchannel.

TABLE 10

| TWT channel field (b0 b1 b2 b3) | First 20 MHz | Second 20 MHz | Third 20 MHz | Fourth 20 MHz | Contents |
|---|---|---|---|---|---|
| 1011 | o | x | o | o | 2nd 20 MHz punctured |
| 1101 | o | o | x | o | 3rd 20 MHz punctured |
| 1110 | o | o | o | x | 4th 20 MHz punctured |
| 0111 | x | o | o | o | 1st 20 MHz punctured |
| 1100 | o | o | x | x | 3rd 20 MHz and 4th 20 MHz punctured |
| 1001 | o | x | x | o | 2nd 20 MHz and 3rd 20 MHz punctured |
| 0011 | x | x | o | o | 1st 20 MHz and 2nd 20 MHz punctured |
| 1111 | o | o | o | o | 80 MHz full use (Not punctured) |
| 0000 | x | x | x | x | Not used |

Technical Feature 5. As shown in Table 10, an STA may configure the information for an 80 MHz channel in 20 MHz subchannels. In this case, an STA requesting the allocation/use of an 80 MHz channel other than the Primary channel may configure the information for each 80 MHz other than the Primary 80 MHz as shown in Table 10 above. The above is an example, and an STA requesting the allocation/use of a primary channel in an SST operation may request the allocation/use of the primary 80 MHz in the manner of Table 10 above. In other words, the STA may configure a TWT channel field comprising a bitmap configured in the manner of Table 10 above.

Furthermore, when performing an SST operation, an STA requesting an 80 MHz segment other than the primary channel may indicate information about the Primary 80 as a punctured channel (or unavailable channel) and transmit information about the remaining 80 MHz (the remaining channels other than P80) to the AP via a TWT Request. For example, an STA requesting a Secondary 80 MHz on 160 MHz may set the above bitmap as [0 0 0 0 1 1 0 1] to request the 2nd channel. As shown in Table 10 above, [0 0 0 0 0 1 1 0 1] may mean not used (or puncturing) for the Primary 80 MHz and not used (or puncturing) for the 20 MHz subchannel of one of the Secondary 80 MHz.

As described above, when constructing the bitmap included in the TWT Request, each of the four bits corresponding to the Primary 80 MHz may be set to a preset value (e.g., "0" or "1"). Thus, for example, if the 80 MHz low frequency from 160 MHz is the Primary 80 channel and the TWT channel field is configured based on [P80 S80], each of the first 4 bits corresponding to the P80 may be set to a preset value (e.g., "0" or "1"). The preset value may refer to an unavailable channel or the like.

For example, if the upper frequency 80 MHz is the primary 80 channel and the TWT channel field is configured based on [S80 P80], each of the second 4 bits corresponding to P80 may be set to a preset value. In this way, the request for P80 may not be performed.

Additionally or alternatively, the STA may transmit channel information for the BSS BW to the AP via the TWT channel field. For example, an STA operating at 160 MHz may configure the TWT channel field for full bandwidth by configuring a bitmap per 80 MHz, based on Table 10 above.

As shown in Table 10, the information for channels below 80 MHz may be configured for the entire band corresponding to the BSS bandwidth, i.e., regardless of the operating capability of the STA (e.g., 80 MHz or 160 MHz), a bitmap in 20 MHz units may be configured for the BSS bandwidth based on the method in Table 10 above.

Technical Feature 6. A 20 MHz only STA or a 20 MHz operating STA may configure the available channel information for 80 MHz as shown in Table 11.

TABLE 11

| TWT channel field (b0 b1 b2 b3) | First 20 MHz | Second 20 MHz | Third 20 MHz | Fourth 20 MHz |
|---|---|---|---|---|
| | ○ | x | x | x |
| | x | ○ | x | x |
| | x | x | ○ | x |
| | x | x | x | ○ |

In the example in Table 11, information about the 80 MHz channel can be configured based on a bitmap of 4 bits in length. For example, when configuring a bitmap of a certain length, the value of the 1 bit corresponding to the Primary 20 MHz channel may be set to a default value (e.g., "1" or "0"). When such a preset value is used, a channel request (e.g., a channel request via TWT Request) may not be performed for the Primary 20 MHz.

Technical Features 7. STAs (i.e., non-AP STAs) operating based on the SST operation of this specification may receive signals from the AP through the subchannel assigned to them. In this case, the AP may transmit signaling (i.e., MU PPDU) to the STA via multi-user (MU) transmission. Therefore, the subchannel requested by STAs (i.e. non-AP STAs) in this specification preferably includes both EHT-SIG-CC1 (content channel 1) and EHT-SIG-CC2. Some of the information in the EHT-SIG field, including the allocation information regarding the RU of the EHT-PPDU, may be carried over EHT-SIG-CC1, while the rest of the information may be carried over EHT-SIG-CC2. In view of this, it is preferred that the subchannel requested by an STA (i.e. non-AP STA) in this specification is configured to include both EHT-SIG-CC1 and EHT-SIG-CC2. In other words, if the subchannel requested by the STA (i.e., the TWT subchannel) includes only one of EHT-SIG-CC1 and EHT-SIG-CC2, it may not be possible to receive some EHT-SIGs of the EHT-PPDU transmitted via OFDMA mode normally, and, accordingly, it may not be possible to decode some RU/MRUs of the EHT-PPDU normally. Therefore, the subchannel requested by the STA is preferably configured to include both EHT-SIG-CC1 and EHT-SIG-CC2.

The technical features applied to the bitmap included in the above TWT channel field (e.g., the bitmap included in the TWT channel field 2260 of FIG. 22) may be variously changed/added.

Technical Features 8. Examples of technical features related to the above TWT channel field are further described below.

Technical Features 8.a. The SST operation proposed in this specification may support multiple (e.g., two) subchannel granularities considering multiple STA types (e.g., 20 MHz only non-AP STA and EHT-STA). For example, a 20 MHz granularity (i.e., 20 MHz subchannel granularity) for 20 MHz only STAs and/or 20 MHz operating STAs and an 80 MHz granularity (i.e., 20 MHz subchannel granularity) for STAs with transmission capability above 80 MHz may be proposed. The specific values of the above subchannel granularities and the number of proposed subchannel granularities may vary as described below.

Technical Feature 8.b. For example, a TWT channel field may include a subchannel granularity of 1 bit and a subchannel information of N bits. For example, if the TWT channel field (e.g., TWT channel field 2260 of FIG. 22) has a length of 8 bits or 16 bits, the remaining bits except for the subchannel granularity 1 bit and the subchannel information N bit may consist of reserved bits. The reserved bits may correspond to LSB bits or MSB bits within the 8 bits or 16 bits.

Technical feature 8.b.i. For example, for SST operation of 20 MHz only non-AP EHT STAs and/or 20 MHz operating STAs, the TWT channel field for 80 MHz may be proposed as a 5-bit (sub)field. For example, the TWT channel field for 80 MHz may comprise a subchannel granularity field (i.e., a 1-bit field) and a channel information field (i.e., a 4-bit field). The subchannel granularity field may include information regarding whether the granularity applied to the channel information field is 20 MHz. For example, if the 1-bit information value of the subchannel granularity has a first value (e.g., "0" or "1"), then a granularity of 20 MHz may be applied to the channel information field.

Technical Feature 8.b.ii. For example, for EHT STAs other than 20 MHz only non-AP EHT-STAs and 20 MHz operating STAs, it is desirable that SST operation is supported in bands above 160 MHz (e.g., 160 MHz, 320 MHz bands). Stated differently, the SST operation described herein may be applied in the 160 MHz band where preamble puncturing may be applied or in the 320 MHz band where preamble puncturing may be applied.

Technical Features 8.b.ii.1. An example of a TWT channel field related to the above-described band above 160 MHz is shown below. In the following example, the subchannels involved in the SST operation may be configured in 80 MHz units.

Technical Feature 8.b.ii.1.a. For example, the TWT channel field may be proposed with 3 bits of information (e.g., 1 bit of subchannel granularity field and 2 bits of channel information field) or 5 bits of information (e.g., 1 bit of subchannel granularity field and 4 bits of channel information field).

Technical feature 8.b.ii. 1.b. The 1-bit subchannel granularity field may have a preset value (e.g., "0" or "1") to indicate a granularity of 80 MHz.

Technical Feature 8.b.ii.1.b.i. For example, the 1-bit sub-channel granularity field may have a first value (e.g., "1") to indicate a granularity of 80 MHz. For example, the sub-channel granularity field of the 1 bit may have a second value (e.g., "0") to indicate a granularity of 20 MHz.

Technical Feature 8.b.ii.1.c. For example, an EHT STA operating in the 160 MHz band or the 320 MHz band may configure the TWT channel field for a subchannel request as follows.

Technical Feature 8.b.ii.1.c.i. For example, the TWT channel field configured by an EHT STA operating in the 160 MHz band may be subchannel granularity 1 bit and (80 MHz) subchannel information 2 bits. The subchannel granularity 1 bit may indicate that the granularity applied to the subchannel information is 80 MHz. The subchannel information 2 bit may indicate information about the request/availability of the subchannel according to the subchannel granularity (1 bit).

Technical Feature 8.b.ii.1.c.ii. For example, the TWT channel field configured by an EHT STA operating in the 160 MHz band may be subchannel granularity 1 bit and (80 MHz) subchannel information 4 bit. The subchannel granularity 1 bit may indicate that the granularity applied to the subchannel information is 80 MHz.

Technical feature 8.b.ii.1. For example, the TWT channel field may be configured as the subchannel granularity field (e.g., a 1-bit field) and a channel information field (e.g., an 8-bit field), regardless of BW. In other words, the TWT channel field may always consist of 9 bits, i.e., the length of the TWT channel field may be fixed at 9 bits. The subchannel granularity field (e.g., a 1-bit field) may indicate a granularity for the channel information field. In this case, the specific granularity may be varied, such as 20 MHz or 40 MHz, and the channel information may represent channel information per 20 MHz or 40 MHz. For example, the granularity for the subchannel may be set to 40 MHz for the 320 MHz band, and 20 MHz for the 80 MHz and/or 160 MHz bands.

Technical Features 8.b.ii.1.c.iv. In the example above, a TWT channel field of 3 bits is proposed for 160 MHZ and a TWT channel field of 5 bits is proposed for 320 MHZ. However, the technical features of the present specification are not limited thereto.

For example, the TWT channel field may have the same length/format regardless of the 160 MHz band and the 320 MHz band. For example, if the format of the TWT channel field is fixed as subchannel granularity 1 bit and subchannel information 4 bits, an STA operating on the 160 MHz band may set some bits of the TWT channel field (i.e., 2 bits for the unused 160 MHz) to a preset value (e.g., a preset value indicating no use).

Technical Feature 8.b.ii.1.d. For example, the (80 MHz) subchannel information field may indicate subchannel and/or puncturing information relevant to the SST operation. For example, if "assigned" or "used" is indicated for a particular (80 MHz) subchannel, puncturing may not be requested for that (80 MHz) subchannel.

Technical Feature 8.b.iii. Additionally or alternatively, for BWs above 80 MHz, subchannel information may be configured as information per 20 MHz. In this case, the information for 80 MHz for which "allocation" or "use" is requested may be configured as follows.

Technical Feature 8.b.iii.1. For example, the TWT channel field may comprise a 2-bit channel indication field and a 4-bit (80 MHz) channel information field. FIG. 19 illustrates an example of the above-described TWT channel field. The (80 MHz) channel information field comprises 4 bits, and the 4 bits may be configured based on Table 10, i.e., the (80 MHz) channel information field may include 20 MHz puncturing information. In another example, the TWT Channel field according to FIG. 19 may comprise the TWT Channel field 2260 of FIG. 22. For example, the TWT Channel field 2260 may have a length of 8 bits or 16 bits. For example, if the TWT Channel field 2260 has a length of 8 bits, the remaining 2 bits other than the 6 bits shown in FIG. 19 may be configured as reserved bits. For example, the reserved bit may comprise 2 LSB bits or 2 MSB bits of the TWT Channel field 2260.

Technical feature 8.b.iii.2. Considering STAs operating in the band up to 320 MHz, the length of the channel indication may comprise 2 bits, i.e., regardless of the operation BW (80/160/320 MHz), the length of the channel indication may be fixed at 2 bits.

Technical feature 8.b.iii.2.a. For example, if the length of the channel indication is fixed to 2 bits, an STA operating at 160 MHz may not need to use some of the values of the 2 bits (e.g., "2", "3"). Those values may be reserved.

Technical feature 8.b.iii.2.b.

For example, the channel indication may be configured as shown in Table 12.

TABLE 12

| B0 B1 | Example 1 | Example 2 |
|---|---|---|
| 00 | P80 MHz | S80 MHz |
| 01 | S80 MHz | P80 MHz |
| 10~11 | Reserved | Reserved |

Unlike the example in Table 12, it is also possible to configure the channel indication based on the lower 80 MHz and upper 80 MHz in the frequency domain rather than the primary/secondary channel.

Technical feature 8.b.iii.3. If the channel indication (2 bits) field is configured by a 20 MHz operating or 20 MHz only STA, the value of the field may have a fixed value/bit (e.g. "00" or "11"). In this case, the channel information field may be constructed on the basis of the technical features described above and included in the TWT channel field.

Technical feature 8.b.iii.4. A STA operating at 80 MHz may configure the channel indication (2 bits) field as follows.

Technical Feature 8.b.iii.4.a. For example, the channel indication (2 bits) field may be as shown in Table 13. In this case, the channel information field may be constructed on the basis of the technical features described above and included in the TWT channel field.

Technical Feature 8.b.iii.4.b. For example, the channel indication (2 bits) field may be as shown in Table 14. In this case, the channel information field may be constructed based on the technical characteristics described above and included in the TWT channel field.

TABLE 13

| B0 B1 | Indication for 80 MHz |
|---|---|
| 00 | first 80 MHz |
| 01 | Second 80 MHz |
| 10 | third 80 MHz |
| 11 | fourth 80 MHz |

TABLE 14

| B0 B1 | Indication for 80 MHz |
|-------|------------------------|
| 00 | P80 MHz |
| 01 | S80 MHz |
| 10 | Lower 80 MHz in S160 |
| 11 | upper 80 MHz in S160 |

Technical Feature 8.b.iii.5. The above example may be varied. For example, the channel indication (2 bits) field may use one bit each to indicate a 160 MHz subchannel and an 80 MHz subchannel.

Technical Feature 8.b.iii.5.a. For example, the B0 bit of the channel indication field may indicate a 160 MHz subchannel, and the B1 bit of the channel indication field may indicate an 80 MHz subchannel in request or an allocated 160 MHz subchannel.

Technical Feature 8.b.iii.5.b. For example, bit B0 of the two bits may be used for 160 MHz subchannel indication, and bit B1 may indicate an 80 MHz subchannel within the 160 MHz indicated via bit B0.

Technical feature 8.b.iii.5.b.i. Specifically, at 320 MHz, P160 and S160 may be indicated by the B0 bit, wherein the P160 may set the 1 bit to 0 and the S160 may set the 1 bit to 1.

Technical feature 8.b.iii.5.b.ii. Further, information about 80 MHz within the allocated 160 MHz may be indicated by the B1 bit. In this case, starting from the lower frequency region, the first/lower 80 MHz may set the B1 bit to 0 and the second/upper 80 MHz may set the B1 bit to 1.

Technical feature 8.b.iii.5.c. For example, if the BSS (transmit) BW is 80 MHz or 160 MHz, the channel indication field may be configured as follows.

Technical feature 8.b.iii.5.c.i. For example, if the BSS BW is 80 MHz, the value of the channel indication (2 bits) field may be set to "00".

Technical feature 8.b.iii.5.c.ii. For example, if the BSS BW is 160 MHz, the value of the B0 bit indicating the 160 MHz subchannel among the 2 bits of the channel indication field may be set to zero. Further, the B1 bit may be configured with indication information (e.g., information that is set to 0 or 1) for the 80 MHz for which the allocation is requested.

Technical Features 9. In the above example, a unit or granularity of 80 MHz is applied to identify the requesting subchannel. However, a unit or granularity of 160 MHz may be applied to identify the subchannel. In this case, information for each 20 MHz subchannel may be identified based on the following example.

Technical Feature 9.a. For example, for 80 MHz, depending on the frequency order (low or high) of that 80 MHz within 160 MHz, the information for that 80 MHz may be configured as information per 20 MHz as described above. The remaining information except for the 80 MHz may be marked as unavailable or punctured to form the channel information for 160 MHz.

Technical Feature 9.a.i. For example, depending on the BW, the channel information may be configured to have different sizes.

Technical Feature 9.a.i.1. For example, the channel information may be configured based on 8-bit information for bands below 160 MHz, and 16-bit information for bands above 320 MHz.

Technical feature 9.a.ii. For example, the channel information may be configured based on a fixed 16 bit size rather than different sizes of 8/16 bits as described above.

Technical feature 9.b. The above TWT channel field may be varied.

FIG. 20 is another example of a TWT channel field. The channel indication field shown in FIG. 20 may have a length of one bit and may include information regarding whether the corresponding 160 MHz channel is a first 160 MHz channel or a second 160 MHz channel (or a primary channel or a secondary channel) within the 320 MHz band.

Further, the (160 MHz) channel information field of FIG. 20 may have a length of 8 bits. The channel information field of FIG. 20 may be information indicative of the availability of a channel per 20 MHz, i.e., each 1 bit of the channel information field may correspond to a 20 MHz subchannel.

As in other examples, the TWT Channel field according to FIG. 20 may comprise the TWT Channel field 2260 of FIG. 22. For example, the TWT Channel field 2260 may have a length of 16 bits. In this case, except for the 9 bits shown in FIG. 20, the remaining 7 bits may be configured as reserved bits. For example, the reserved bit may comprise 7 LSB bits or 7 MSB bits of the TWT Channel field 2260.

The various technical features described above relate to the configuration of the TWT channel field included in the TWT Request, i.e., the non-AP STA may configure the TWT channel field for the request subchannel based on the above, and the AP STA may configure the TWT channel field for the response subchannel based on the above. The TWT channel fields configured by the non-AP STA may be included in the TWT Request, and the TWT channel fields configured by the AP STA may be included in the TWT Response. For example, a non-AP STA and an AP STA may both configure TWT channel fields in the same way.

An AP STA that receives a TWT channel field included in a TWT request transmitted by a non-AP STA may determine the response subchannel based on the received TWT channel field. Information about the response subchannel is included in the TWT channel field, and the TWT channel field configured by the AP STA may be transmitted to the Non-AP STA via a TWT Response. This process may correspond to steps S1810 and S1820 of FIG. 18.

For example, the AP STA may determine the response subchannel to be the same as the request subchannel of the non-AP STA, i.e., all of the non-AP STA's request subchannel may be accepted by the AP STA. More specifically, a bitmap having the same value as the bitmap of the TWT channel field included in the TWT Request may be transmitted to the non-AP STA in the TWT Response.

For example, the AP STA may reject all/part of the non-AP STA's request subchannel. In this case, the AP STA may identify a possible subchannel, determine that subchannel as the response subchannel, and transmit information regarding the response subchannel to the non-AP STA via a TWT Response. Additionally or alternatively, the always-AP STA may reply in a TWT Response only with information about subchannels that are not available to the AP among the non-AP's requested subchannels. In this case, the information about the subchannels not available to the AP may be included in the TWT channel field, based on the technical characteristics described above.

The non-AP STA may obtain information about the subchannel to be used for the SST operation from the TWT Response. For example, if the same bitmap transmitted by the non-AP STA is replied, the non-AP STA may know that the SST operation will be performed over the requested subchannel. For example, if a different bitmap is replied than the bitmap transmitted by the non-AP STA, the non-AP STA may know that the SST operation is performed over a different subchannel than the request subchannel.

If an EHT PPDU is received via the downlink after the TWT Response is received, the non-AP STA may know in advance the information of the subsequently received DL PPDU (e.g., the EHT PPDU received via step S1830 of FIG. 18) through information about at least one subchannel (i.e., the TWT subchannel) included in the TWT Response. For example, if some subchannels are "not allocated" via TWT Request/Response, preamble puncturing may be applied by the AP STA for those subchannels and/or RUs may not be allocated for those subchannels. As described above, allocation information regarding RUs allocated by the AP STA or information regarding preamble puncturing by the AP STA may be included in the signal field (i.e., U-SIG field and/or EHT-SIG field) of the EHT PPDU (received via step S1830).

If an EHT PPDU is transmitted over the uplink after the TWT Response is received, the Non-AP STA may construct the EHT PPDU from information regarding at least one subchannel (i.e., TWT subchannel) included in the TWT Response. For example, based on the at least one subchannel included in the TWT Response, the Non-AP STA may not assign RUs to unused/unallocated subchannels. Additionally or alternatively, the Non-AP STA may perform preamble puncturing for unused/unassigned subchannels based on the at least one subchannel included in the TWT Response. As described above, the allocation information regarding the allocated RUs and/or the information regarding the preamble puncturing may be included in the signaling fields (i.e., U-SIG field and/or EHT-SIG field) of the EHT PPDU (transmitted via step S1830).

Hereinafter, a TWT element comprising the above-described TWT channel field is described. As described above, the TWT element may be transmitted to the STA via a TWT Request/Response.

FIG. 21 illustrates a structure of a TWT element of the present disclosure. As shown, the TWT element may include an Element ID field, a Length field, a Control field, and a TWT Parameter Information field.

FIG. 22 illustrates the structure of a TWT Parameter Information field according to the present disclosure. The TWT channel field described above may be included in the TWT Parameter Information field of FIG. 22.

As shown in FIG. 22, the TWT Parameter Information field may include a Request Type field 2210, a Target Wake Time field 2220, a TWT Group Assignment field 2230, a Nominal Minimum TWT Wake Duration field 2240, a TWT Wake Interval Mantissa field 2250, a TWT Channel field 2260, and an NDP Paging field 2270.

The TWT Channel field 2260 of FIG. 22 may be configured as a bitmap of varying lengths according to the methods described above. For example, the TWT Channel field 2260 may comprise the subchannel granularity bit (e.g., 1 bit) and the subchannel information (e.g., N bits). Alternatively, the TWT Channel field 2260 may comprise various fields as described above (1-bit/2-bit channel indication field, 80/160 MHz channel information field).

As described above, the TWT Channel field 2260 may have a length of 8 bits or 16 bits. For example, if the total length of the various bits included within the TWT Channel field 2260 (e.g., the subchannel granularity bit/field, the subchannel information bit/field, the channel indication bit/field, and the 80/160 MHz channel information bit/field) is less than 8 bits or 16 bits, the remaining bits may comprise a reserved bit. In this case, the reserved bit may consist of the LSB (or MSB) of the 8 bits (or 16 bits).

The Request Type field 2210 of FIG. 22 may have a length of 16 bits. The Request Type field 2210 may include 1 bit of information regarding whether the corresponding TWT element is for a TWT Request or a TWT Response. Further, the Request Type field 2210 may include a TWT flow identifier, which is 3 bits of information to identify the corresponding TWT element. Further, the Request Type field 2210 may include a TWT Wake Interval Exponent field for calculating a wake interval.

The Target Wake Time field 2220 of FIG. 22 may include an 8-bit unsigned integer information related to the TSF time at which the STA requests to wake up. The TWT Group Assignment field 2230 of FIG. 22 may include information required to group TWT parameters. The Nominal Minimum TWT Wake Duration field 2240 of FIG. 22 may include 8 bits of information regarding the minimum amount of time the corresponding STA is expected to be awake. The TWT Wake Interval Mantissa field 2250 of FIG. 22 may include 16 bits of information used in conjunction with the TWT Wake Interval Exponent field to calculate the wake interval. The NDP Paging field 2270 of FIG. 22 is an optional field and may include information related to an NDP Paging frame.

The technical features of this specification are subject to various changes. Various operations performed by an STA operating on the basis of this specification are described below.

Figure 23:
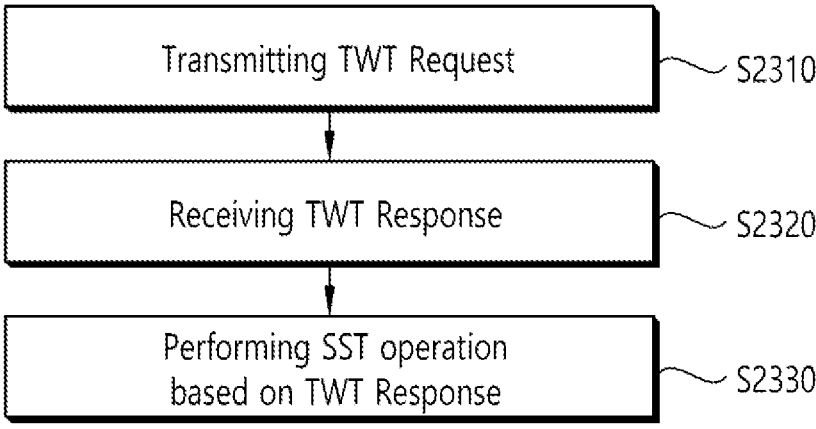
FIG. 23 is a procedural flow diagram illustrating operations performed at the transmitting STA.

FIG. 23 is a procedural flow diagram illustrating operations performed in a transmitting STA. For example, the operations of FIG. 23 may be performed in a non-AP STA (e.g., a non-AP EHT STA). The STA performing the operations of FIG. 23 may be referred to by various names, such as a transmitting STA, a first STA, etc.

As in steps S2310 and S2320, the first STA may negotiate a subchannel for the SST operation. For example, steps S2310 and S2320 may correspond to steps S1810 and S1820 of FIG. 18.

Based on a step of S2310, the first STA may transmit a target wake time (TWT) request field to the second STA. The TWT channel field may include a first sub-channel information field relating to at least one sub-channel on which the first STA may operate, among a plurality of sub-channels, a first sub-channel granularity field relating to a granularity of the first sub-channel information field, and the first sub-channel granularity field may have a length of one bit.

For example, if the first STA is a 20 MHz only non-AP EHT STA and/or a 20 MHz operating STA, the first sub-channel granularity field may have a value of 1 and the granularity of the first subchannel information field may be set to 20 MHz.

For example, if the first STA is a conventional EHT STA (e.g., an EHT STA other than the 20 MHz only non-AP EHT STA and 20 MHz operating STA), the EHT STA may support a bandwidth of 160 MHz and/or a bandwidth of 320 MHz. In this case, the first subchannel granularity field may have a second value. In this case, the granularity of the first subchannel information field may be set based on the bandwidth of the operating band of the first STA. For example, if the bandwidth of the operating band of the first STA is 160 MHz, the granularity of the first subchannel information field may be determined to be 80 MHz, and the at least one subchannel in which the first STA may operate may be defined as 2 bits of information. For example, if the bandwidth of the operating band of the first STA is 320 MHz, the granularity of the first subchannel information field may be determined to be 80 MHz and the at least one subchannel in which the first STA may operate may be defined as 4 bits of information.

According to step S2320, in response to the TWT request field, the first STA may receive a TWT response field from the second STA. The TWT response field may include a second subchannel information field related to at least one subchannel on which the second STA may operate, and a second subchannel granularity field related to a granularity of the second subchannel information field. The second subchannel granularity field may have a length of one bit.

The second subchannel information field included in the TWT response field may be configured in the same manner as the first subchannel information field, i.e., it may include a 1-bit granularity field as described above and a subchannel information field consisting of 2/4 bits.

For example, if all of the subchannels requested by the first STA are accepted by the second STA, the first subchannel information field may have the same value as the second subchannel information field. For example, if some/all of the subchannels requested by the first STA are not accepted by the second STA, the first subchannel information field may have a different value than the second subchannel information field.

According to step S2330, the first STA may perform an SST operation based on the TWT response field. For example, step S2330 may correspond to step S1830.

Through step S2330, the first STA may determine information about a subchannel available to the second STA, i.e., the first STA may determine information about a subchannel available to the second STA based on the TWT response field. The first STA may complete the SST operation based on the subchannel available to the first/second STA. For example, a UL or DL EHT PPDU may be delivered based on the subchannel available to the first/second STA. For example, based on the subchannel available to the first/second STA, preamble puncturing may be applied to the EHT PPDU. For example, based on the subchannels available to the first/second STA, the at least one RU included in the EHT PPDU may be determined.

Figure 24:
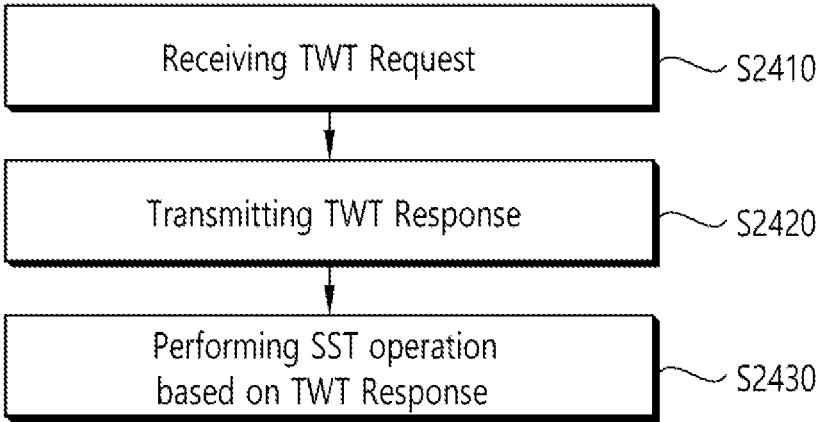
FIG. 24 is a flowchart illustrating the operations performed at the receiving STA.

FIG. 24 is a procedural flow diagram illustrating operations performed at a receiving STA. For example, the operations of FIG. 24 may be performed at an AP (EHT) STA. The STA performing the operations of FIG. 24 may be referred to by various names, such as a receiving STA, a second STA, etc.

According to step S2410, the second STA may receive the target wake time (TWT) request field from the first STA. The technical features of step S2410 may be the same as the technical features of step S2310.

According to step S2420, in response to the TWT request field, the second STA may transmit a TWT response field from the first STA. The technical features of step S2420 may be the same as the technical features of step S2320.

In step S2430, an SST operation between the first STA and the second STA may be performed. The technical features of the step S2430 may be the same as the technical features of the step S2330.

Each of the operations illustrated in FIGS. 23 and 24 may be performed by the apparatus of FIGS. 1 and/or 14. For example, the transmitting STA of FIG. 23 or the receiving STA of FIG. 24 may be implemented by the apparatus of FIGS. 1 and/or 14. The processor of FIG. 1 and/or FIG. 14 may perform each of the operations of FIGS. 23 and 24 described above. Further, the transceiver of FIG. 1 and/or FIG. 14 may perform each of the operations described in FIGS. 3 through 24.

The devices (e.g., the transmitting STA and the receiving STA) proposed herein do not necessarily comprise a transceiver and may be implemented in the form of a chip including a processor and memory. Such devices may generate/store transmit/receive PPDUs according to any of the examples described above. Such a device may be connected to a separately manufactured transceiver to support actual transmission and reception.

The present disclosure proposes computer readable recording media implemented in various forms. A computer readable medium according to the present disclosure may be encoded with at least one computer program comprising instructions. The instructions stored on the medium may control the processor illustrated in FIG. 1 and/or FIG. 14, that is, the instructions stored on the medium may control the processor presented herein to perform the operations of the transmitting and receiving STA described above (e.g., FIGS. 23 and 24).

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method used in a wireless local area network (WLAN) system, the method comprising:

transmitting, by a first station (STA), a target wake time (TWT) request field to a second STA;

receiving, by the first STA, a TWT response field from the second STA; and performing, by the first STA, a Subchannel Selective Transmission (SST) operation based on the TWT response field, wherein the TWT request field includes a TWT channel field for an operating band of the first STA, wherein the TWT channel field includes a first subchannel information field including information related to at least one sub-channel requested by the first STA among a plurality of sub-channels, and a first subchannel granularity field related to a granularity of the first sub-channel information field, wherein the first subchannel granularity field has a length of 1 bit, wherein based on the first subchannel granularity field having a first value and a bandwidth of the operating band of the first STA being 160 MHz, the granularity of the first subchannel information field is set to 80 MHZ, and the at least one subchannel requested by the first STA is determined based on 2-bit information included in the first subchannel information field, and wherein based on the first subchannel granularity field having the first value and the bandwidth being 320 MHz, the granularity of the first subchannel information field is set to 80 MHz, and the at least one subchannel requested by the first STA is determined based on 4-bit information included in the first subchannel information field.

2. The method of claim 1, wherein based on the first subchannel granularity field having a second value, the granularity of the first subchannel information field is set to 20 MHz.

3. The method of claim 1, wherein the TWT response field includes a second subchannel information field including information on at least one subchannel accepted by the second STA, and a second subchannel granularity field related to a granularity of the second subchannel information field, wherein the second subchannel granularity field has a length of 1 bit.

4. The method of claim 3, wherein based on all of the at least one subchannel requested by the first STA being accepted by the second STA, a value of the second subchannel information field is equal to a value of the first subchannel information field, wherein based on some or all of the at least one subchannel requested by the first STA being not accepted by the second STA, the value of the second subchannel information field is different from the value of the first subchannel information field.

5. The method of claim 1, wherein the TWT channel field has a length of 16 bits.

6. The method of claim 1, wherein an extremely high throughput (EHT) PPDU including a resource unit (RU) allocated based on the TWT response field is received through the SST operation.

7. The method of claim 1, wherein an Extremely High Throughput (EHT) PPDU on which preamble puncturing is performed based on the TWT response field is received through the SST operation.

8. The method of claim 1, further comprising:

transmitting, by the first STA to the second STA, an EHT capability information field including information related to a bandwidth of an operating band of the first STA and information related to at least one resource unit (RU) supported by the first STA.

9. A first station (STA) in a wireless local area network (WLAN) system, comprising:

a transceiver transmitting and/or receiving a wireless signal; and a processor controlling the transceiver, wherein the processor is configured to:

transmit, via the transceiver, a target wake time (TWT) request field to a second STA;

receive, via the transceiver, a TWT response field from the second STA; and perform a Subchannel Selective Transmission (SST) operation based on the TWT response field, wherein the TWT request field includes a TWT channel field for an operating band of the first STA, wherein the TWT channel field includes a first subchannel information field including information related to at least one sub-channel in which the first STA can requested by the first STA among a plurality of subchannels, and a first subchannel granularity field related to a granularity of the first sub-channel information field, wherein the first subchannel granularity field has a length of 1 bit;

wherein based on the first subchannel granularity field having a first value and a bandwidth of the operating band of the first STA being 160 MHz, the granularity of the first subchannel information field is set to 80 MHZ, and the at least one subchannel requested by the first STA is determined based on 2-bit information included in the first subchannel information field, and wherein based on the first subchannel granularity field having the first value and the bandwidth being 320 MHz, the granularity of the first subchannel information field is set to 80 MHz, and the at least one subchannel requested by the first STA is determined based on 4-bit information included in the first subchannel information field.

10. A method used in a wireless local area network (WLAN) system, the method comprising:

receiving, by a second station (STA), a target wake time (TWT) request field from a first STA;

transmitting, by the second STA, a TWT response field to the first STA; and performing, by the second STA, a Subchannel Selective Transmission (SST) operation based on the TWT response field, wherein the TWT request field includes a TWT channel field for an operating band of the first STA, wherein the TWT channel field includes a first subchannel information field including information related to at least one sub-channel requested by the first STA among a plurality of sub-channels, and a first subchannel granularity field related to a granularity of the first sub-channel information field, wherein the first subchannel granularity field has a length of 1 bit;

wherein based on the first subchannel granularity field having a first value and a bandwidth of the operating band of the first STA being 160 MHz, the granularity of the first subchannel information field is set to 80 MHz, and the at least one subchannel requested by the first STA is determined based on 2-bit information included in the first subchannel information field, and wherein based on the first subchannel granularity field having the first value and the bandwidth being 320 MHz, the granularity of the first subchannel information field is set to 80 MHz, and the at least one subchannel requested by the first STA is determined based on 4-bit information included in the first subchannel information field.

* * * * *